US012669739B2

(12) United States Patent
Lee et al.

(10) Patent No.: US 12,669,739 B2
(45) Date of Patent: Jun. 30, 2026

(54) LENS DRIVING DEVICE, CAMERA MODULE, AND OPTICAL DEVICE

(71) Applicant: LG INNOTEK CO., LTD., Seoul (KR)

(72) Inventors: Jun Taek Lee, Seoul (KR); Kyoung Ho Yoo, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 338 days.

(21) Appl. No.: 18/019,669

(22) PCT Filed: May 27, 2021

(86) PCT No.: PCT/KR2021/006593
§ 371 (c)(1),
(2) Date: Feb. 3, 2023

(87) PCT Pub. No.: WO2022/055074
PCT Pub. Date: Mar. 17, 2022

(65) Prior Publication Data
US 2023/0305362 A1     Sep. 28, 2023

(30) Foreign Application Priority Data
Sep. 14, 2020    (KR) ........................ 10-2020-0117815

(51) Int. Cl.
G03B 5/04 (2021.01)
G03B 13/36 (2021.01)
(Continued)

(52) U.S. Cl.
CPC .............. G03B 5/04 (2013.01); G03B 13/36 (2013.01); G03B 30/00 (2021.01); H02K 11/215 (2016.01);
(Continued)

(58) Field of Classification Search
CPC .. G03B 30/00; G03B 5/00; G03B 2205/0007; G03B 2205/0015; G03B 13/36;
(Continued)

(56) References Cited

U.S. PATENT DOCUMENTS

2010/0110270 A1    5/2010  Sekimoto et al.
2014/0362284 A1*  12/2014  Shin ..................... G02B 27/646
                                                    348/373
(Continued)

FOREIGN PATENT DOCUMENTS

CN          104238238 A     12/2014
CN          104635401 A      5/2015
(Continued)

*Primary Examiner* — Bumsuk Won
*Assistant Examiner* — Alex Park Rickel
(74) *Attorney, Agent, or Firm* — Birch, Stewart, Kolasch & Birch, LLP

(57) ABSTRACT

An embodiment of the present invention relates to a lens driving device comprising: a base; a housing disposed on the base; a substrate disposed between the base and the housing; a holder disposed in the housing; a first magnet and a first coil for moving the housing and the holder in an optical-axis direction; a second magnet disposed in the holder; and a second coil disposed between the housing and the substrate and placed in a position corresponding to the second magnet, wherein the second coil moves the holder in a direction perpendicular to the optical-axis direction, a first region of the substrate is connected to the housing and a second region of the substrate is connected to the base, and the first region of the substrate is moved according to the movement of the housing.

20 Claims, 26 Drawing Sheets

(51) Int. Cl.

| | | |
|---|---|---|
| *G03B 30/00* | (2021.01) | |
| *H02K 11/215* | (2016.01) | |
| *H02K 41/035* | (2006.01) | |
| *H04N 23/54* | (2023.01) | |

(52) U.S. Cl.
CPC . *H02K 41/0354* (2013.01); *G03B 2205/0015* (2013.01); *G03B 2205/0069* (2013.01); *H04N 23/54* (2023.01)

(58) Field of Classification Search
CPC .............. G03B 3/10; G03B 2205/0069; G02B 13/0001; G02B 27/646; G02B 7/04; G02B 7/09; H04N 23/682; H04N 23/685; H04N 23/687; H04N 23/54; H02K 11/215; H02K 11/33; H02K 41/0354
See application file for complete search history.

(56) References Cited

U.S. PATENT DOCUMENTS

| | | | | |
|---|---|---|---|---|
| 2016/0085086 A1* | 3/2016 | Rho | ..................... | H04N 23/682 |
| | | | | 359/557 |
| 2016/0274375 A1 | 9/2016 | Park et al. | | |
| 2017/0139225 A1 | 5/2017 | Lim | | |
| 2019/0033613 A1 | 1/2019 | Takimoto et al. | | |
| 2019/0141248 A1* | 5/2019 | Hubert | ................... | H05K 1/189 |
| 2020/0192054 A1 | 6/2020 | Wang | | |
| 2020/0209711 A1 | 7/2020 | Tseng et al. | | |
| 2021/0149150 A1* | 5/2021 | Park | ......................... | G03B 3/10 |
| 2021/0173223 A1* | 6/2021 | Seo | ........................... | G02B 7/09 |
| 2021/0173224 A1* | 6/2021 | Seo | ........................... | G03B 5/02 |
| 2021/0239493 A1* | 8/2021 | Pang | ....................... | G03B 5/00 |
| 2021/0266463 A1* | 8/2021 | Chun | .................... | G03B 30/00 |

FOREIGN PATENT DOCUMENTS

| | | |
|---|---|---|
| CN | 105652557 B | 12/2018 |
| JP | 2009-128377 A | 6/2009 |
| JP | 2013-3417 A | 1/2013 |
| JP | 2014-145854 A | 8/2014 |
| JP | 2016-148860 A | 8/2016 |
| JP | 2017-161665 A | 9/2017 |
| JP | 2018-72761 A | 5/2018 |
| JP | 2019-512734 A | 5/2019 |
| KR | 10-2016-0001577 A | 1/2016 |
| KR | 10-2016-0112126 A | 9/2016 |
| KR | 10-2019-0013561 A | 2/2019 |
| KR | 10-2019-0029169 A | 3/2019 |
| KR | 10-2020-0075744 A | 6/2020 |
| WO | WO 2019/066530 A1 | 4/2019 |

* cited by examiner (a)

(b)

(a)

(b)

LENS DRIVING DEVICE, CAMERA MODULE, AND OPTICAL DEVICE

CROSS REFERENCE TO RELATED APPLICATIONS

This application is the National Phase of PCT International Application No. PCT/KR2021/006593, filed on May 27, 2021, which claims priority under 35 U.S.C. 119(a) to Patent Application No. 10-2020-0117815, filed in the Republic of Korea on Sep. 14, 2020, all of which are hereby expressly incorporated by reference into the present application.

TECHNICAL FIELD

The present embodiment relates to a lens driving device, a camera module, and an optical device.

BACKGROUND ART

As the spread of various portable terminals is widely generalized and wireless Internet services are commercialized, the demands of consumers related to portable terminals are also diversifying, so that various types of additional devices are being installed in the portable terminals.

Among them, a typical example is a camera module that photographs a picture or video of a subject. Meanwhile, an auto focus function for automatically adjusting a focus according to a distance of a subject is applied to a recent camera module. In addition, a handshake correction function for compensating the user's handshake is also applied.

Recently, the trend of a camera for a portable terminal is gradually progressing towards miniaturization and high pixelization. However, in a high-pixel small camera module, it is difficult to implement an autofocus function and a handshake correction function because the aperture of a lens is large and the size of the entire module is small.

DETAILED DESCRIPTION OF THE INVENTION

Technical Subject

The present embodiment is intended to provide a lens driving device capable of implementing an autofocus function and a handshake correction function even in a small camera module with high pixels.

Technical Solution

The lens driving device according to this embodiment comprises: a base; a housing being disposed on the base; a substrate being disposed between the base and the housing; a holder being disposed inside the housing; a first magnet and a first coil for moving the housing and the holder in an optical axis direction; a second magnet being disposed in the holder; and a second coil being disposed between the housing and the substrate and disposed at a position corresponding to the second magnet, wherein the second coil moves the holder in a direction perpendicular to the optical axis direction, wherein a first region of the substrate is connected to the housing, wherein a second region of the substrate is connected to the base, and wherein the first region of the substrate may be moved according to the movement of the housing.

The first region comprises a body portion in which the second coil is disposed, and the substrate may comprise an elastic connection portion connecting the first region and the second region.

The elastic connection portion may connect the body portion and the second region.

The first region may comprise one end portion being coupled to the housing and an elastic connection portion connecting the one end portion and the body portion.

The lens driving device according to this embodiment comprises: a base; a first frame being disposed on the base; a substrate being disposed between the base and the first frame; a second frame being disposed inside the first frame; a third frame being disposed between the first frame and the second frame; a second magnet being disposed in the second frame; and a second coil being disposed between the first frame and the substrate and disposed at a position corresponding to the second magnet, wherein the second coil moves the second frame in a direction perpendicular to the optical axis direction, wherein the first frame is moved in the optical axis direction and the second frame is moved in a direction perpendicular to the optical axis direction, and wherein the substrate may be moved according to the movement of the first frame.

The substrate comprises: a first region being coupled to the base; a second region being coupled to the first frame; and an elastic connection portion connecting the first region and the second region, wherein the elastic connection portion of the substrate may comprise a portion having flexibility.

The elastic connection portion of the substrate may have a shape bent a plurality of times, wherein the elastic connection portion of the substrate may be overlapped with the second coil in the optical axis direction.

The substrate may be formed in a shape symmetrical with respect to an optical axis.

A mover comprises the first to third frames, the first frame comprises a housing, the second frame comprises a holder, and the third frame comprises a frame; and the lens driving device may comprise a first ball being disposed between the housing and the frame, and a second ball being disposed between the frame and the holder.

The housing comprises a first groove in which the first ball is disposed, the first ball is in contact with the housing at two or more points, and the first groove of the housing may be formed to be longer than the diameter of the first ball in a first direction perpendicular to the optical axis direction.

The frame comprises a first groove being formed at an upper surface of the frame and in which the second ball is disposed, and the first groove of the frame may be formed to be longer than the diameter of the second ball in the optical axis direction and in a second direction perpendicular to the first direction.

The frame comprises a second groove being formed at a lower surface of the frame and in which the first ball is disposed, the second groove of the frame is formed in a shape corresponding to at least a portion of the first ball, the holder comprises a groove in which the second ball is disposed, and the groove of the holder may be formed in a shape corresponding to at least a portion of the second ball.

The first ball guides the frame to move in a first direction perpendicular to the optical axis direction with respect to the housing, and the second ball may guide the holder to move in a second direction perpendicular to the optical axis direction and the first direction with respect to the frame.

The lens driving device may comprise: a first coil being disposed in the housing; and a first magnet being disposed in the base.

The first coil may be electrically connected to the substrate.

The lens driving device may comprise a first yoke being disposed in the housing and being disposed inside the first coil.

The housing may comprise: a lower plate; and a side plate being extended from the lower plate, wherein the second coil is disposed at a lower surface of the lower plate of the housing, and wherein the substrate may be coupled to the lower surface of the lower plate of the housing.

The lens driving device may comprise a second yoke being disposed inside the second coil at the lower surface of the lower plate of the housing.

The lens driving device comprises a third ball being in contact with the housing and the base, wherein the third ball may guide the housing to move in the optical axis direction with respect to the base.

The lens driving device comprises: a cover member comprising an upper plate and a side plate being extended from the upper plate, and a spacer being disposed between the cover member and the base, wherein the housing comprises a second groove in which the third ball is disposed, and wherein the spacer may comprise an upper plate and a protruding portion protruding downward from the upper plate of the spacer and at least a portion thereof is inserted into the second groove of the housing.

The lens driving device comprises a driver IC being disposed in the substrate and electrically connected to the first coil and comprising a Hall element detecting the first magnet; and a Hall sensor being disposed in the substrate and detecting the second magnet.

The lens driving device comprises a third ball being in contact with the housing and the base, the third ball comprises a third-first ball being disposed at one side of the first coil and a third-second ball being disposed at the other side of the first coil, the base comprises a first surface facing the housing and a groove being recessedly formed into the first surface of the base, the third-first ball is disposed at the first surface of the base, and the third-second ball may be disposed in the groove of the base.

A groove may not be formed in a region of the first surface of the base in which the third-first ball is disposed.

The housing may comprise a protruding portion protruding toward the first surface of the base, and the third ball may be disposed in the protruding portion of the housing.

The lens driving device comprises: a third magnet disposed on the base; and a fourth magnet disposed in the housing, wherein the fourth magnet may be disposed at a position corresponding to the third magnet so that an attractive force acts with the third magnet.

The lens driving device comprises: a housing cover being coupled to the housing and disposed above the holder; a fifth magnet being disposed in the housing cover; and a sixth magnet being disposed in the holder, wherein the frame and the second ball are disposed below the holder, and wherein the sixth magnet may be disposed at a position corresponding to the fifth magnet so that a repulsive force acts with the fifth magnet.

The lens driving device may comprise a second yoke being disposed at a position corresponding to the second magnet in the base so that an attractive force acts with the second magnet.

A camera module according to the present embodiment may comprise: a printed circuit board; an image sensor being disposed in the printed circuit board; a lens driving device being disposed on a pre-printed circuit board; and a lens being coupled to the second frame of the lens driving device.

An optical device according to the present embodiment may comprise: a main body; a camera module being disposed on the main body; and a display being disposed in the main body and outputting at least one of an image and a video photographed by the camera module.

The lens driving device according to the present embodiment comprises: a base; a housing being disposed inside the base; a holder being disposed inside the housing; a first magnet and a first coil for moving the housing and the holder in an optical axis direction; a second magnet being disposed in the holder; a second coil being disposed in the housing and disposed in a position corresponding to the second magnet; and a substrate connecting the housing and the base, wherein the substrate comprises a first coupling portion being coupled to the base, a second coupling portion being coupled to the housing, and a connecting portion connecting the first coupling portion and the second coupling portion, wherein the connecting portion of the substrate comprises a portion having flexibility, and wherein the second coupling portion of the substrate may be coupled to the second coil through a conductive member.

The lens driving device according to the present embodiment comprises: a base; a first frame being disposed on the base; a second frame being disposed inside the first frame; a first magnet being disposed in any one of the base and the first frame and a first coil being disposed in the other one of the base and the first frame; a second magnet being disposed in the second frame; a first frame cover being coupled to the first frame and disposed on the second frame; a first repulsive magnet being disposed in the second frame; and a second repulsive magnet disposed in the first frame cover and disposed at a position corresponding to the first repulsive magnet, wherein a repulsive force may be generated in an optical axis direction between the first repulsive magnet and second repulsive magnet.

A third frame being disposed between the first frame and the second frame may be comprised.

A fifth magnet being disposed in the third frame may be comprised.

Advantageous Effects

Through the present embodiment, the camera module comprising the lens driving device can be miniaturized and highly pixelized.

Furthermore, a precise auto focus function and handshake correction function may be implemented.

BEST MODE

Figure 1:
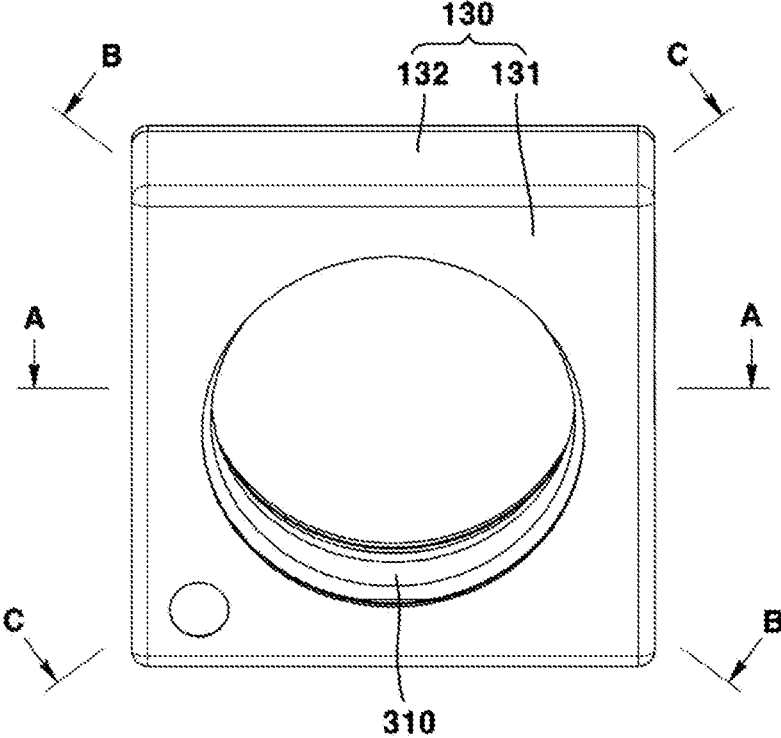
FIG. 1 is a perspective view of a lens driving device according to a present embodiment.

Hereinafter, preferred embodiments of the present invention will be described in detail with reference to the accompanying drawings.

However, the technical idea of the present invention is not limited to some embodiments to be described, but may be implemented in various forms, and inside the scope of the technical idea of the present invention, one or more of the constituent elements may be selectively combined or substituted between embodiments.

In addition, the terms (comprising technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may comprise the plural form unless specifically stated in the phrase, and when described as "at least one (or more than one) of A and B and C", it may comprise one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also comprise cases of being 'connected', 'coupled', or 'interconnected' due that another component between that other components.

In addition, when described as being formed or arranged in "on (above)" or "below (under)" of each component, "on (above)" or "below (under)" means that it comprises not only the case where the two components are directly in contact with, but also the case where one or more other components are formed or arranged between the two components. In addition, when expressed as "on (above)" or "below (under)", the meaning of not only an upward direction but also a downward direction based on one component may be comprised.

An 'optical axis direction' used hereinafter is defined as an optical axis direction of a lens and/or an image sensor being coupled to a lens driving device.

The 'vertical direction' used hereinafter may be a direction parallel to the optical axis direction. The vertical direction may correspond to the 'z-axis direction'. The 'horizontal direction' used hereinafter may be a direction perpendicular to the vertical direction. That is, the horizontal direction may be a direction perpendicular to the optical axis. Accordingly, the horizontal direction may comprise an 'x-axis direction' and a 'y-axis direction'.

The 'auto focus (AF) function' used hereinafter is defined as a function to automatically focus on a subject by adjusting the distance from the image sensor by moving the lens in an optical axis direction according to the distance of the subject so that the image sensor can obtain a clear image of the subject. Meanwhile, 'auto focus' may correspond to 'AF (auto focus)'.

The 'handshake correction function' used below is defined as a function of moving or tilting a lens in a direction perpendicular to an optical axis direction to offset vibration (movement) generated in an image sensor by an external force. Meanwhile, 'handshake correction' may be used interchangeably with ' OIS (optical image stabilization)' or 'optical image stabilization'.

Hereinafter, a lens driving device according to a present embodiment will be described with reference to drawings.

Figure 2:
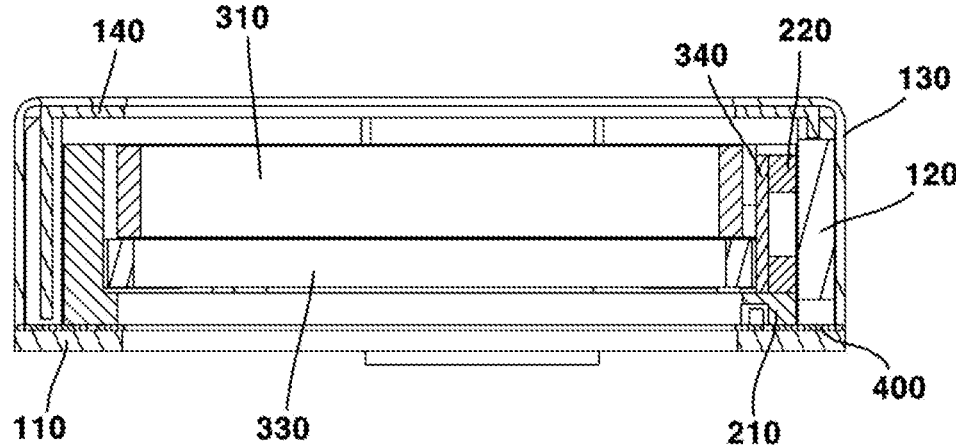
FIG. 2 is a cross-sectional view viewed from A-A in FIG. 1.
Figure 3:
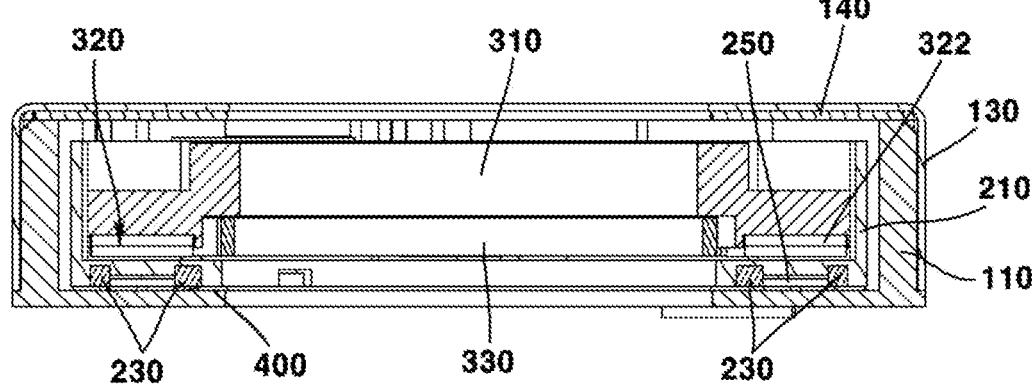
FIG. 3 is a cross-sectional view viewed from line B-B in FIG. 1.
Figure 4:
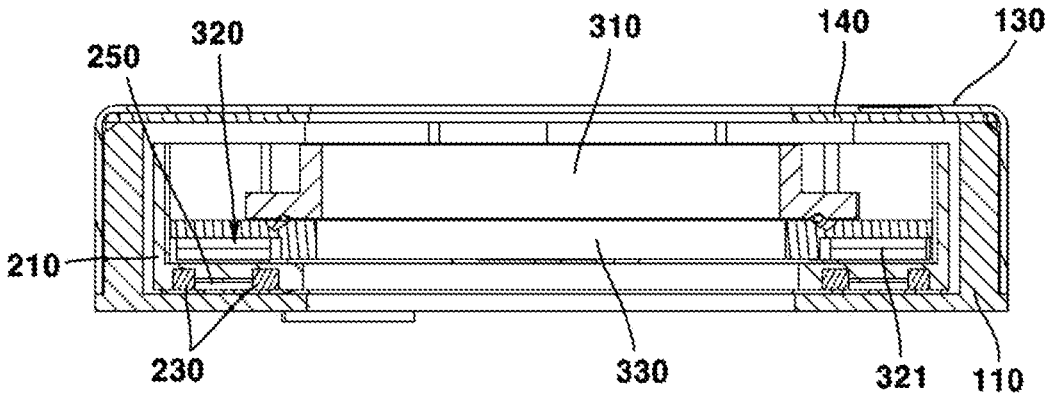
FIG. 4 is a cross-sectional view viewed from C-C in FIG. 1.
Figure 5:
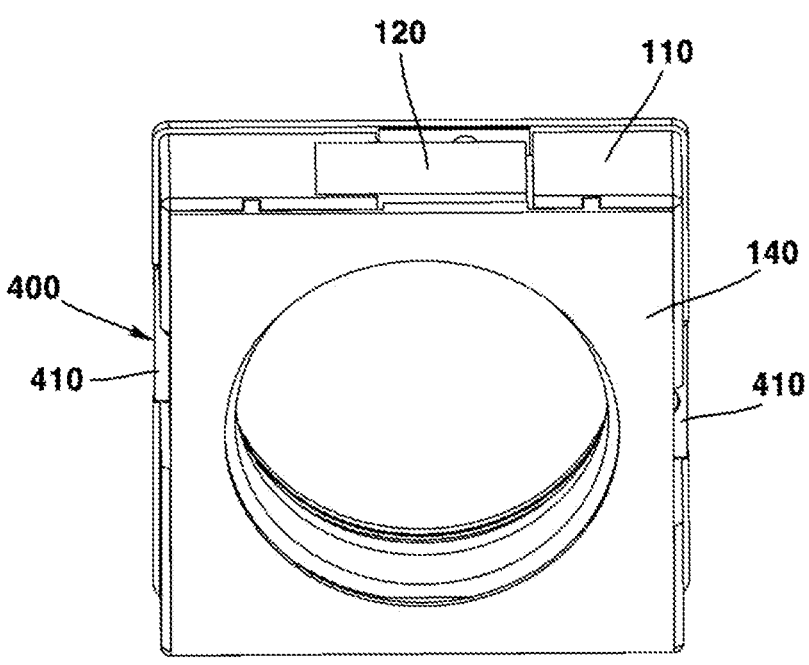
FIG. 5 is a perspective view of a state in which a cover member is omitted in FIG. 1.
Figure 6:
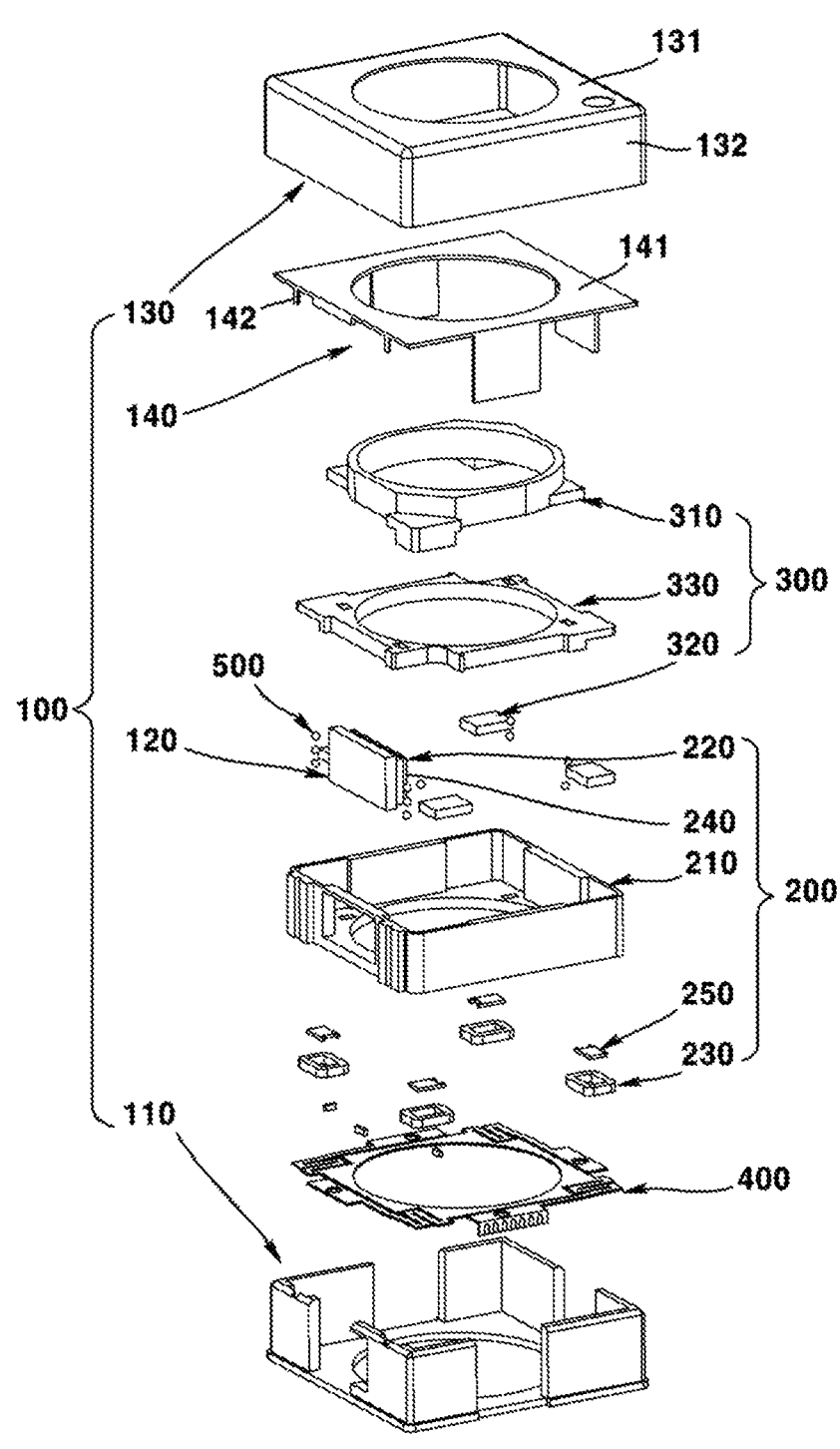
FIG. 6 is an exploded perspective view of a lens driving device according to the present embodiment.
Figure 7:
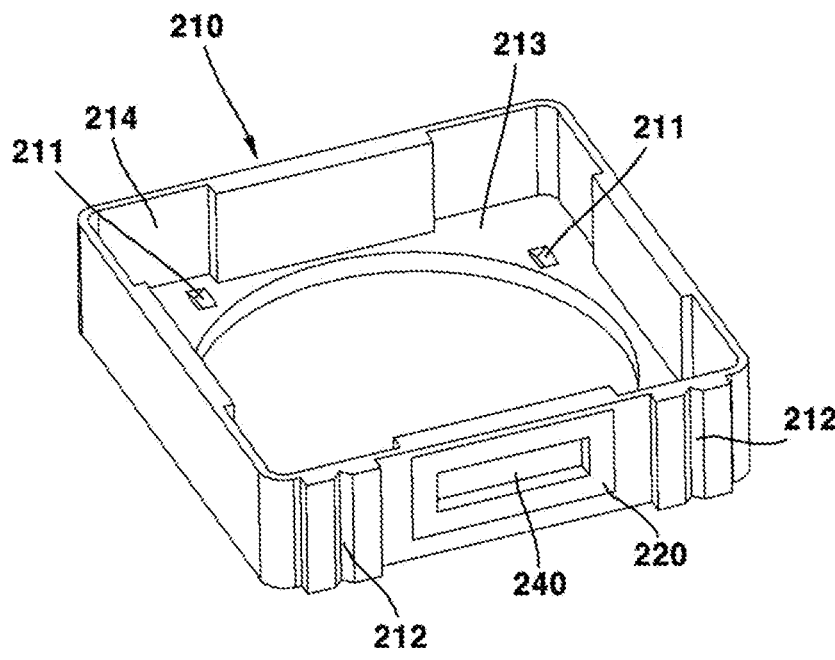
FIG. 7 is a perspective view illustrating a housing and related configurations of a lens driving device according to the present embodiment.
Figure 8:
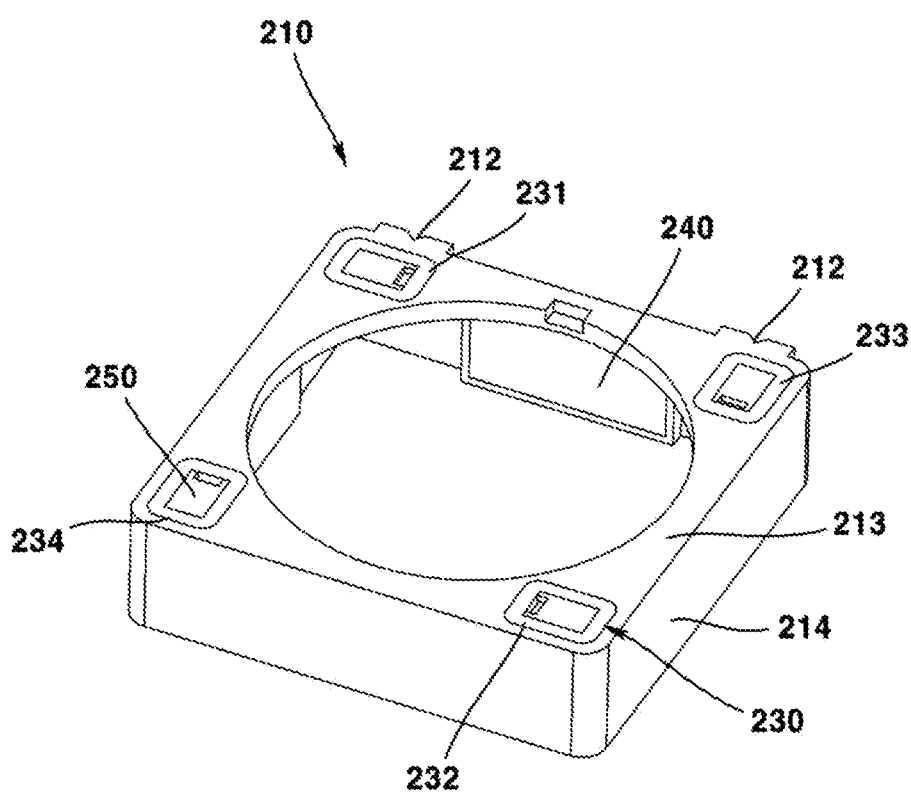
FIG. 8 is a perspective view of FIG. 7 viewed from another direction.
Figure 9:
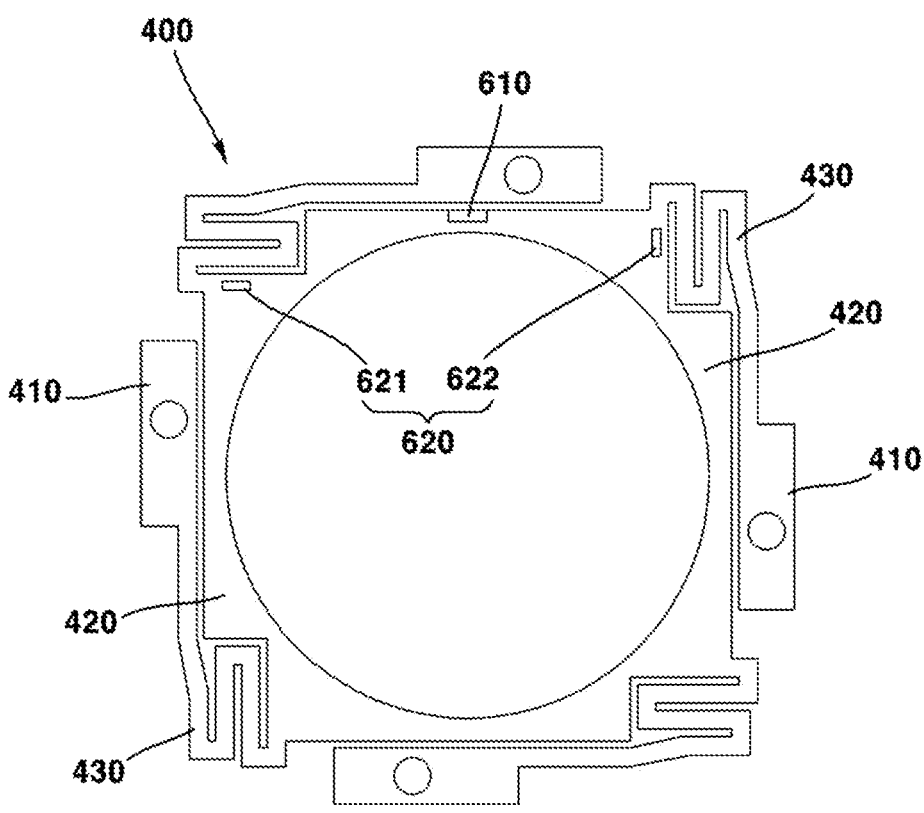
FIG. 9 is a plan view illustrating a substrate and related configurations of the lens driving device according to the present embodiment.
Figure 10:
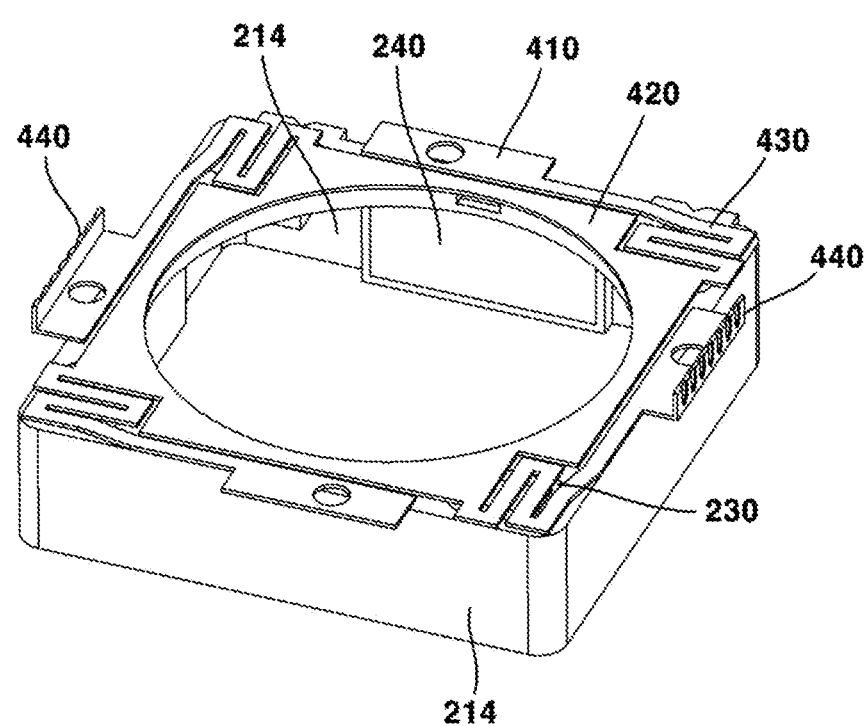
FIG. 10 is a perspective view illustrating a coupled state of a housing and a substrate of a lens driving device according to the present embodiment.
Figure 11:
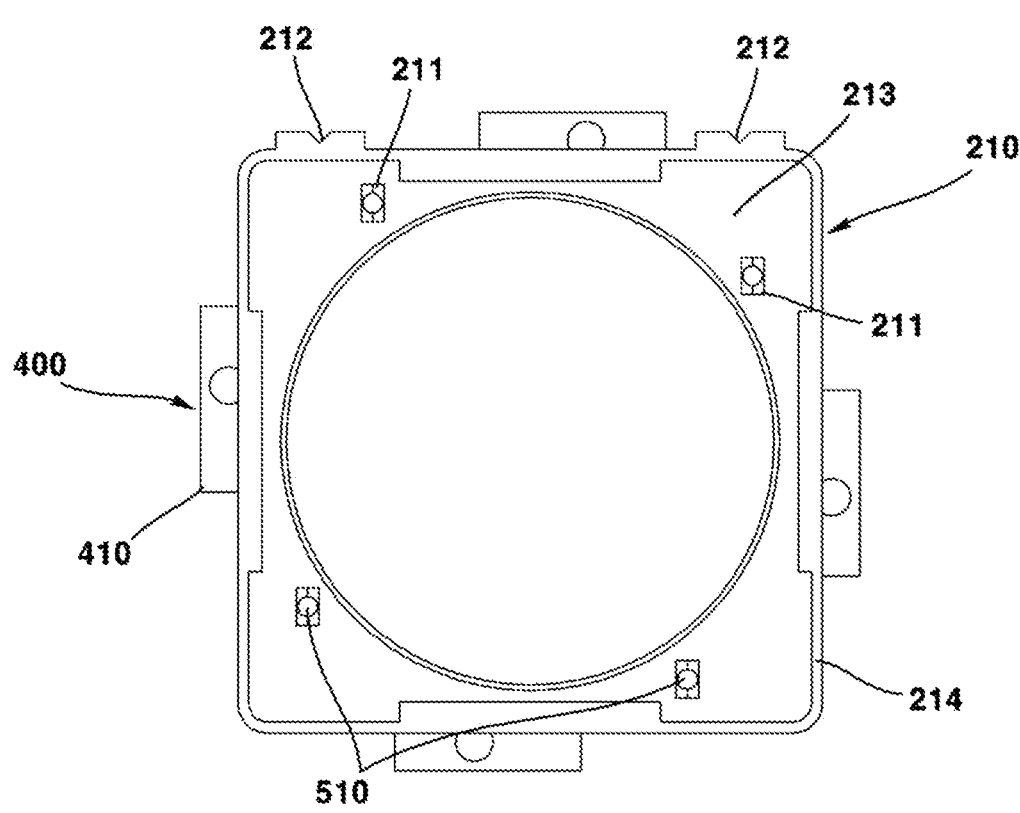
FIG. 11 is a plan view illustrating the arrangement structure of a housing and a first ball of a lens driving device according to the present embodiment.
Figure 12:
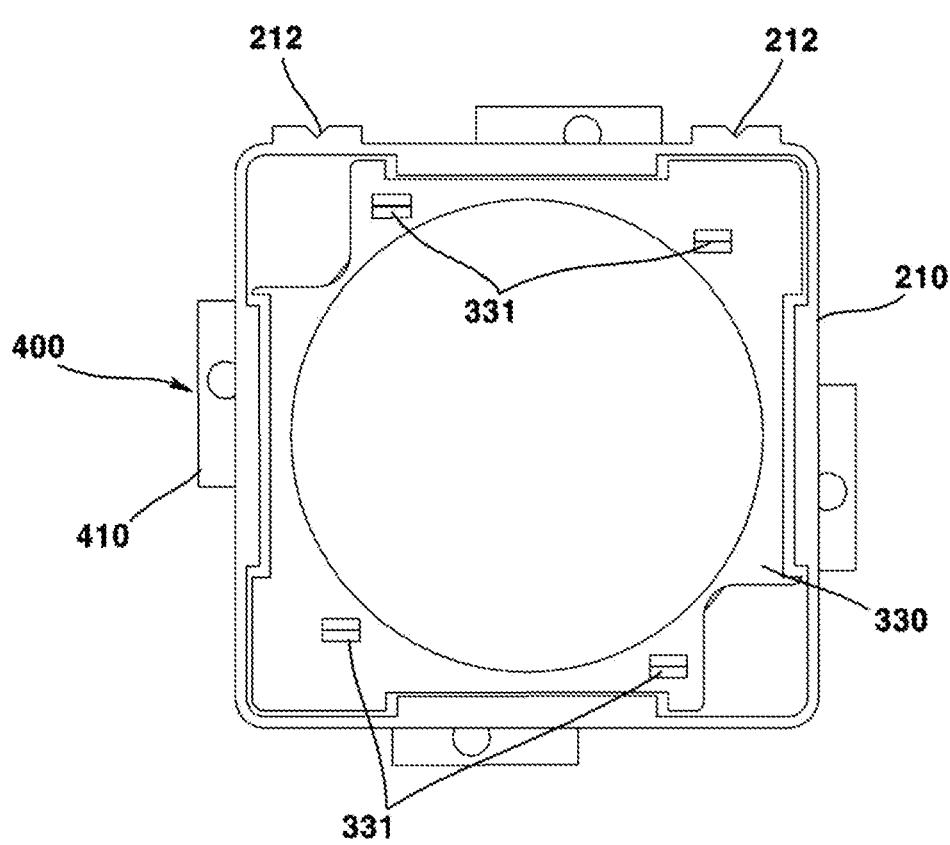
FIG. 12 is a plan view illustrating a state in which movers are arranged in FIG. 11.
Figure 13:
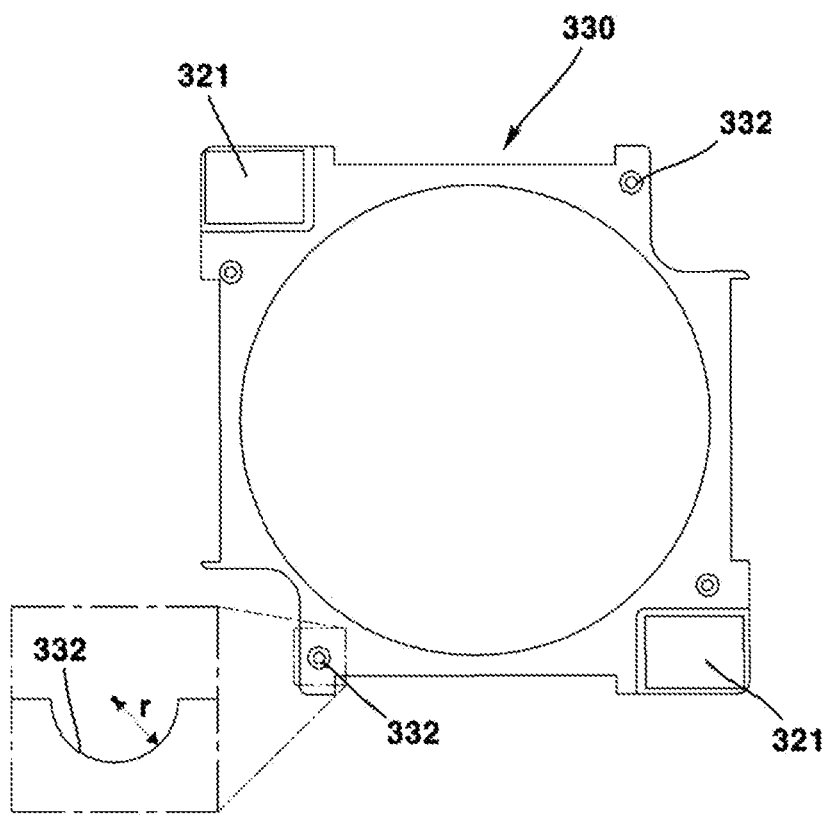
FIG. 13 is a bottom view of a mover and related configurations of a lens driving device according to the present embodiment.
Figure 14:
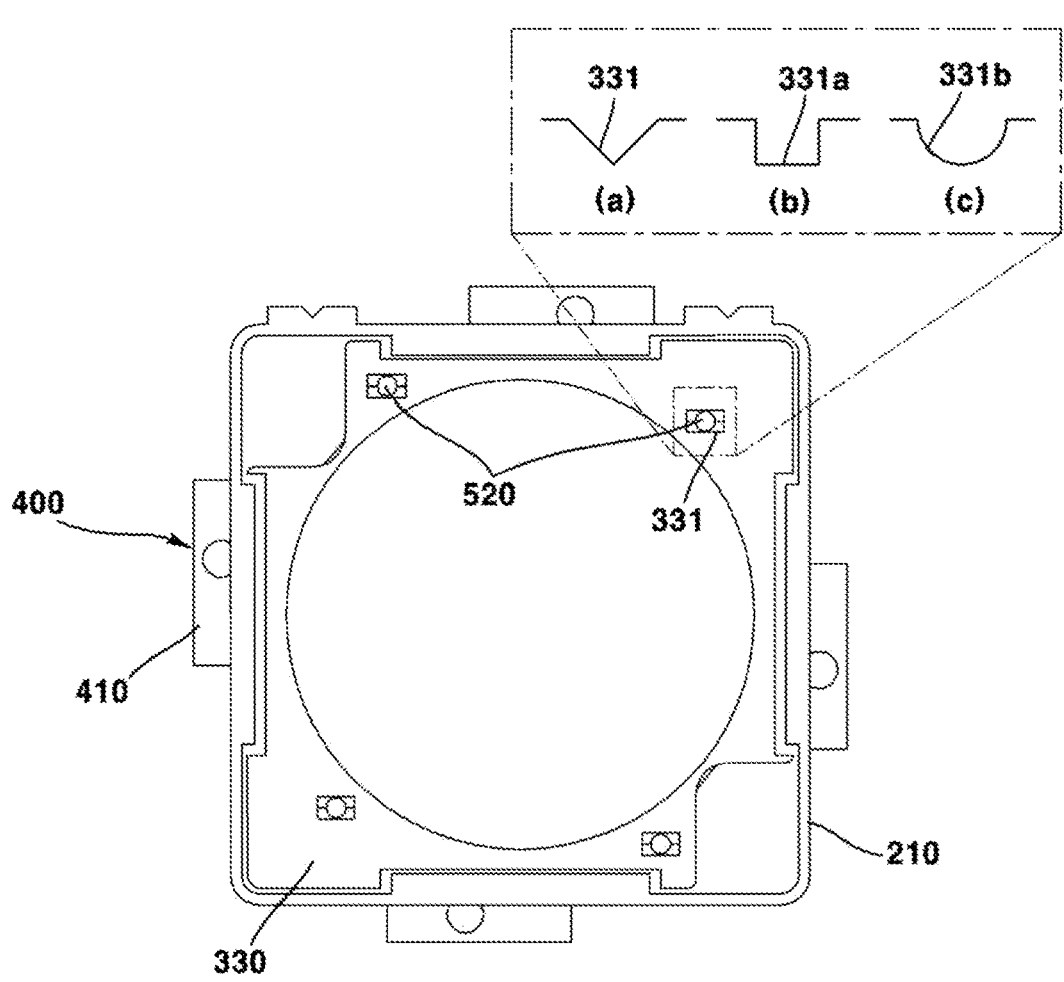
FIG. 14 is a plan view illustrating a state in which a second ball is disposed in FIG. 12, an enlarged view of a groove of a mover, and a view of a modified embodiment.
Figure 15:
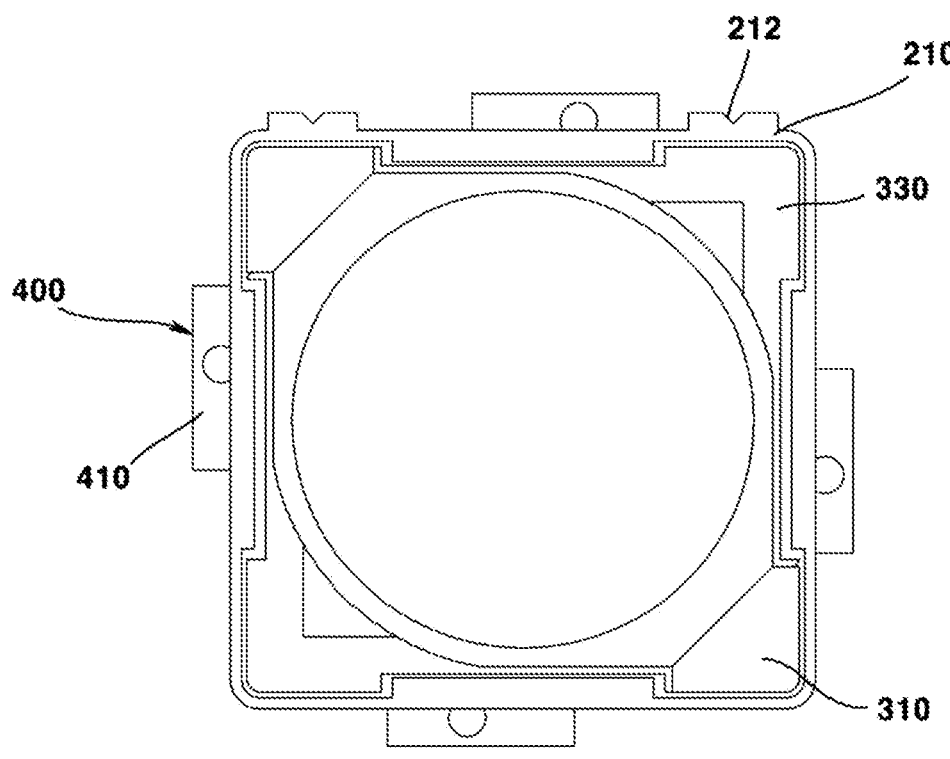
FIG. 15 is a plan view illustrating a state in which a holder is disposed in FIG. 14.
Figure 16:
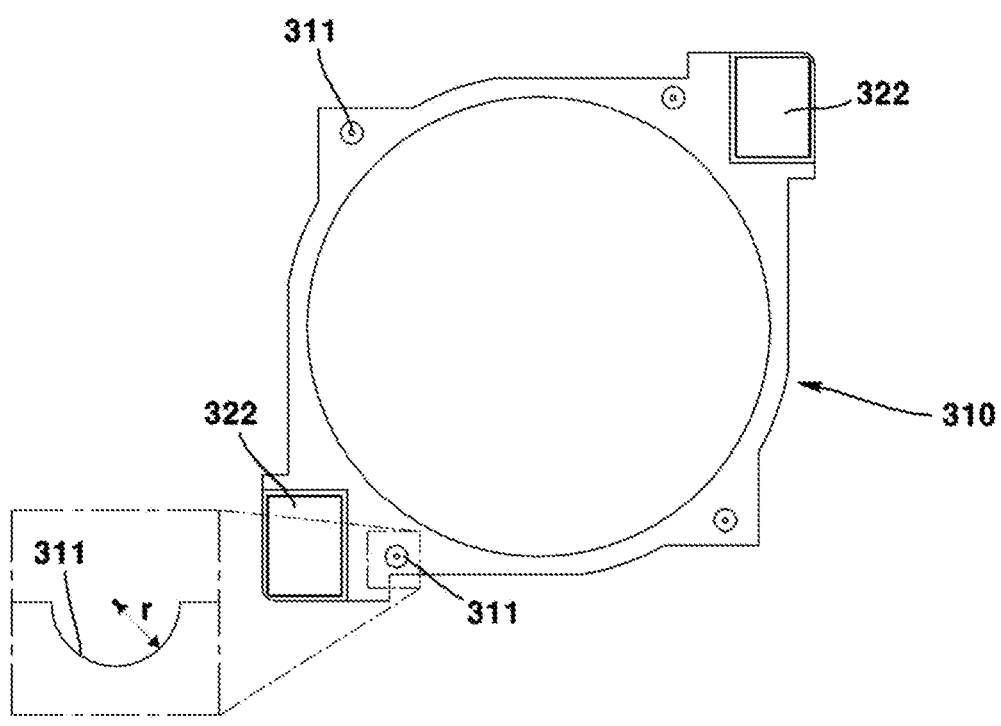
FIG. 16 is a bottom view of a holder and related configurations of a lens driving device according to the present embodiment, and an enlarged view of a groove of the holder.
Figure 17:
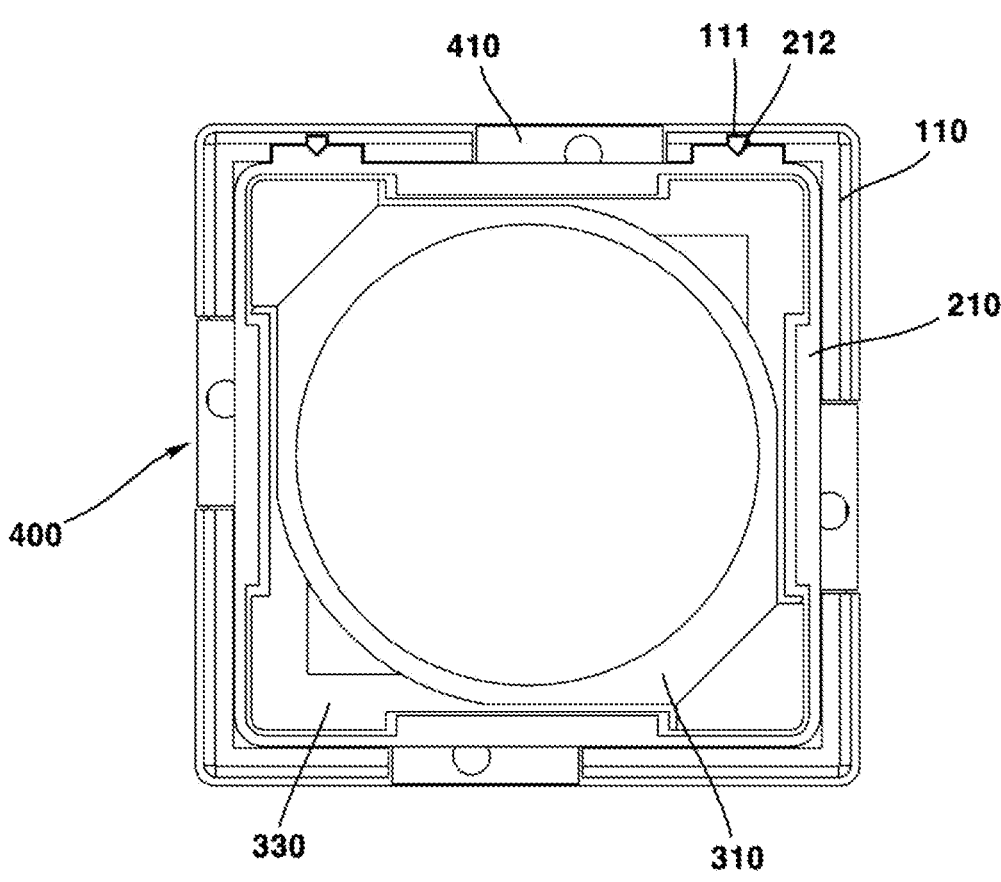
FIG. 17 is a plan view of some configurations of a lens driving device according to the present embodiment.
Figure 18:
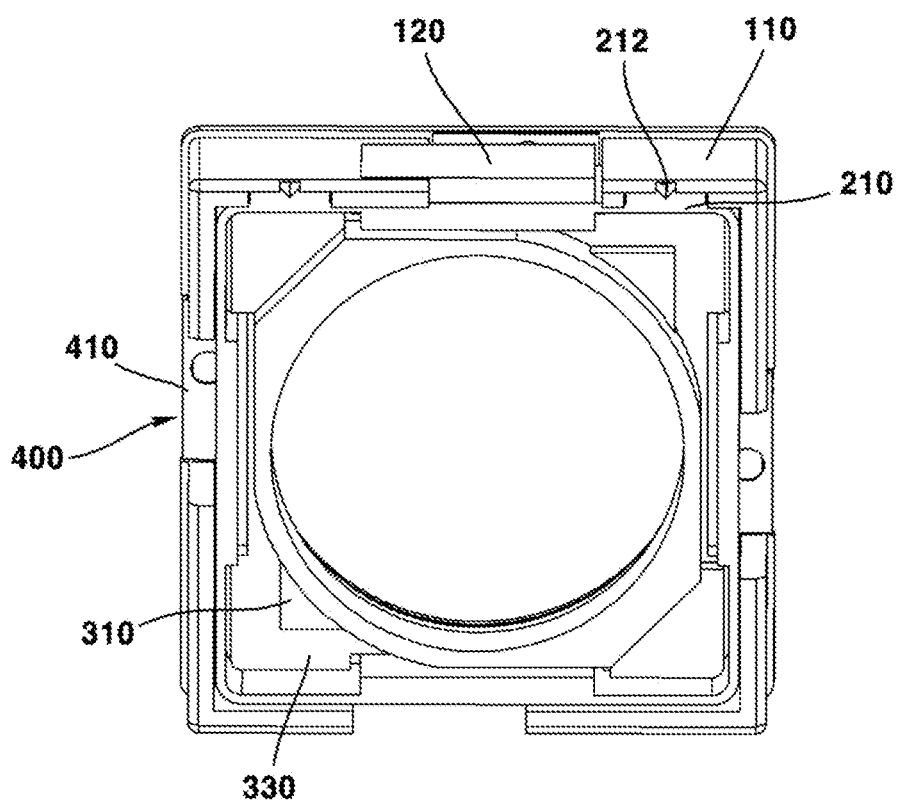
FIG. 18 is a perspective view of a state in which a cover member and a spacer are omitted in a lens driving device according to the present embodiment.
Figure 19:
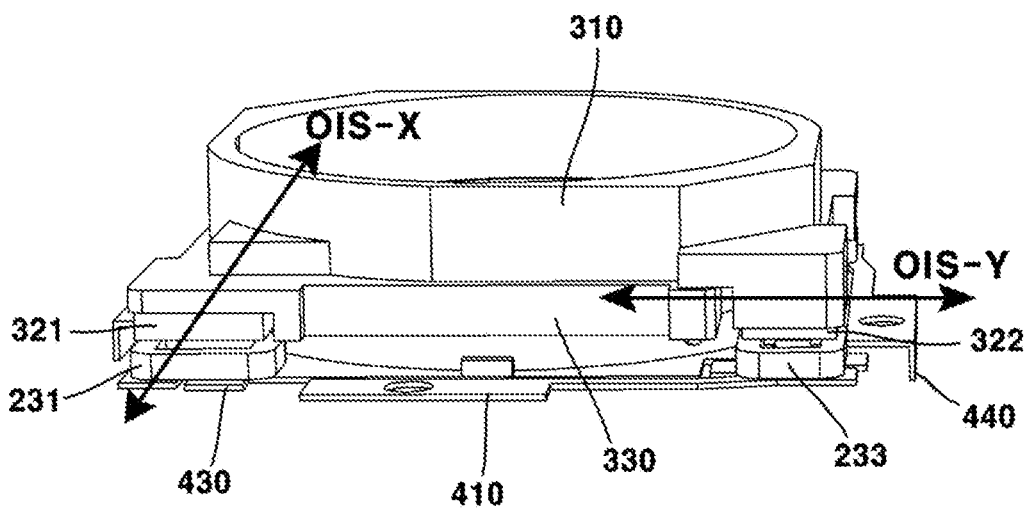
FIG. 19 is a diagram explaining OIS driving of a lens driving device according to the present embodiment.
Figure 20:
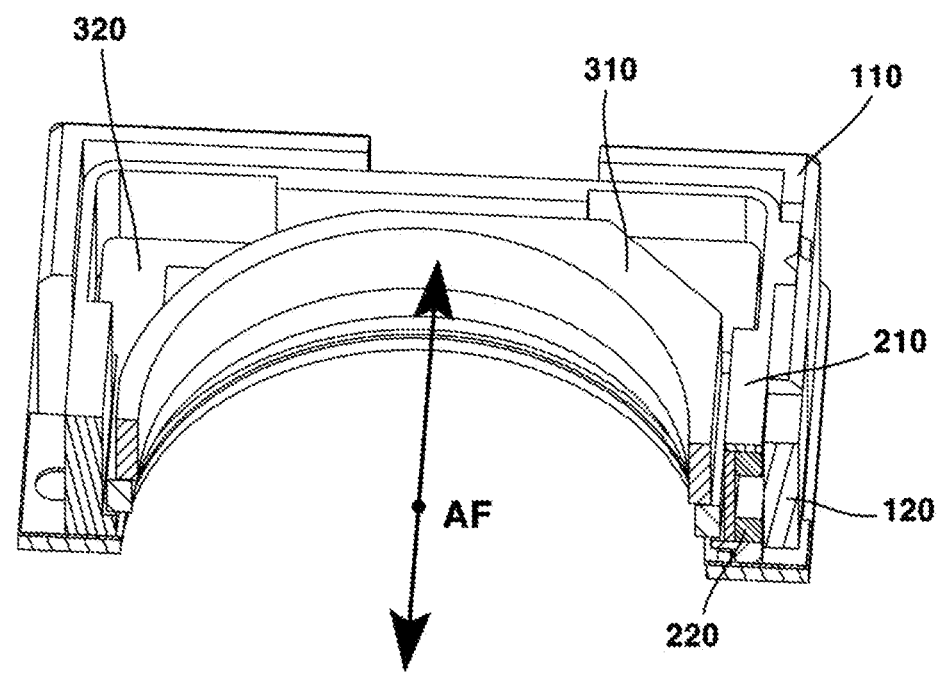
FIG. 20 is a diagram explaining AF driving of a lens driving device according to the present embodiment.

FIG. 1 is a perspective view of a lens driving device according to a present embodiment; FIG. 2 is a cross-sectional view viewed from A-A in FIG. 1; FIG. 3 is a cross-sectional view viewed from line B-B in FIG. 1; FIG. 4 is a cross-sectional view viewed from C-C in FIG. 1; FIG. 5 is a perspective view of a state in which a cover member is omitted in FIG. 1; FIG. 6 is an exploded perspective view of a lens driving device according to the present embodiment; FIG. 7 is a perspective view illustrating a housing and related configurations of a lens driving device according to the present embodiment; FIG. 8 is a perspective view of FIG. 7 viewed from another direction; FIG. 9 is a plan view illustrating a substrate and related configurations of the lens driving device according to the present embodiment; FIG. 10 is a perspective view illustrating a coupled state of a housing and a substrate of a lens driving device according to the present embodiment; FIG. 11 is a plan view illustrating the arrangement structure of a housing and a first ball of a lens driving device according to the present embodiment; FIG. 12 is a plan view illustrating a state in which movers are arranged in FIG. 11; FIG. 13 is a bottom view of a mover and related configurations of a lens driving device according to the present embodiment; FIG. 14 is a plan view illustrating a state in which a second ball is disposed in FIG. 12, an enlarged view of a groove of a mover, and a view of a modified embodiment; FIG. 15 is a plan view illustrating a state in which a holder is disposed in FIG. 14; FIG. 16 is a bottom view of a holder and related configurations of a lens driving device according to the present embodiment, and an enlarged view of a groove of the holder; FIG. 17 is a plan view of some configurations of a lens driving device according to the present embodiment; FIG. 18 is a perspective view of a state in which a cover member and a spacer are omitted in a lens driving device according to the present embodiment; FIG. 19 is a diagram explaining OIS driving of a lens driving device according to the present embodiment; and FIG. 20 is a diagram explaining AF driving of a lens driving device according to the present embodiment.

The lens driving device 10 may comprise a stator 100. The stator 100 may move the first mover 200 and the second mover 300. The stator 100 may accommodate the first mover 200 and the second mover 300 therein. The stator 100 may be a relatively fixed portion when the first mover 200 and the second mover 300 move.

The lens driving device 10 may comprise a base 110. The stator 100 may comprise a base 110. The base 110 may be disposed outside the housing 210. The base 110 may be disposed outside the holder 310. The base 110 may accommodate at least a portion of the housing 210. The base 110 may accommodate at least a portion of the holder 310. The base 110 may be coupled to the cover member 130. The base 110 may be spaced apart from the holder 310. At least a portion of the base 110 may be spaced apart from the housing 210.

The base 110 may comprise a lower plate and a side plate. The base 110 may comprise a lower plate being disposed below the housing 210 and a plurality of side plates being extended upward from the lower plate. A plurality of side plates of the base 110 may be disposed to surround the housing 210.

The base 110 may comprise a groove 111. The groove 111 may accommodate a third ball 530. The groove 111 may be a third ball accommodating groove. The groove 111 may be recessedly formed on an inner surface of the side plate of the base 110. The depth of the groove 111 may be smaller than the diameter of the third ball 530. The third ball 530 may be in contact with the groove 111 at least two points or more. The third ball 530 may be in contact with the groove 111 at three points. As a modified embodiment, the third ball 530 may be in contact with the groove 111 at one point.

The lens driving device 10 may comprise a first magnet 120. The stator 100 may comprise a first magnet 120. The first magnet 120 may be disposed in the base 110. The first magnet 120 may face the first coil 220. The first magnet 120 may be disposed to face the first coil 220. The first magnet 120 may interact with the first coil 220 electromagnetically. The first magnet 120 may move the housing 210 and the holder 310 in an optical axis direction. The first magnet 120 may be an AF driving magnet. The first magnet 120 may move the housing 210 and the holder 310 in an optical axis direction through interaction with the first coil 220. The first magnet 120 may move the housing 210 and the holder 310 in an optical axis direction through electromagnetic interaction with the first coil 220.

The lens driving device 10 may comprise a cover member 130. The stator 100 may comprise a cover member 130. The cover member 130 may cover the base 110. The cover member 130 may be disposed to surround the base 110. The cover member 130 may cover the base 110. The cover member 130 may cover the housing 210. The cover member 130 may cover the holder 310. The cover member 130 may comprise a 'cover can'. The cover can may support the entire structure. The cover member 130 may be a non-magnetic material. The cover member 130 may be formed of metal. The cover member 130 may be formed of a metal plate. The cover member 130 may be connected to the ground portion of the printed circuit board 50. Through this, the cover member 130 may be grounded. The cover member 130 may block electromagnetic interference (EMI). At this time, the cover member 130 may be referred to as an 'EMI shield can'.

The cover member 130 may comprise an upper plate 131. The cover member 130 may comprise a side plate 132. The cover member 130 may comprise an upper plate 131 and a side plate 132 being extended from the upper plate 131. The side plate 132 of the cover member 130 may be coupled to the base. The cover member 130 may comprise an upper plate 131 comprising a hole and a side plate 132 being extended downward from an outer periphery or edge of the upper plate 131. The side plate 132 may comprise a plurality of side plates. The side plate 132 may comprise four side plates.

The lens driving device 10 may comprise a spacer 140. The stator 100 may comprise a spacer 140. The spacer 140 may be disposed between the cover member 130 and the base 110. The spacer 140 may be disposed in the base 110. The spacer 140 may be coupled to the base 110. The spacer 140 may comprise an upper plate 141. The spacer 140 may comprise a protruding portion 142. The protruding portion 142 may protrude downward from the upper plate 141. At least a portion of the protruding portion 142 may be inserted into the second groove 212 of the housing 210. Through this, the protruding portion 142 of the spacer 140 can prevent the third ball 530 disposed in the second groove 212 of the housing 210 from being separated upward. The spacer 140 may be assembled to prevent the ball and the magnet from falling out.

The lens driving device 10 may comprise a first mover 200. The first mover 200 may be disposed inside the stator 100. The first mover 200 may be movably disposed inside the stator 100. The first mover 200 may move in an optical axis direction with respect to the stator 100. At this time, the second mover 300 may move together with the first mover 200. The first mover 200 may move to drive AF. The first mover 200 may be an AF mover.

The lens driving device 10 may comprise a housing 210. The first mover 200 may comprise a housing 210. Housing 210 may be disposed inside the base 110. The housing 210 may be disposed outside the holder 310. The housing 210 may accommodate the holder 310 therein. A first coil 220 and a second coil 230 may be disposed in the housing 210. The housing 210 may move in an optical axis direction. The housing 210 may move during AF driving.

The housing 210 may comprise a first groove 211. A first ball 510 may be disposed in the first groove 211. The first groove 211 may be a first ball accommodating groove. The first groove 211 may be formed to be longer than the diameter of the first ball 510 in a first direction perpendicular to the optical axis direction. The first groove 211 may guide the first ball 510 to move in a first direction perpendicular to the optical axis direction.

The housing 210 may comprise a second groove 212. A third ball 530 may be disposed in the second groove 212. The second groove 212 may be a third ball accommodating groove. The second groove 212 may be formed at an outer side surface of the housing 210. The housing 210 may comprise a first surface facing the side plate of the base 110. The second groove 212 may be recessedly formed at the first surface of the housing 210. The second groove 212 may be extended in an optical axis direction. The second groove 212 may be formed to be longer than the diameter of the third ball 530 in an optical axis direction. The second groove 212 may guide the third ball 530 to move in an optical axis direction.

The housing 210 may comprise a lower plate 213. The lower plate 213 may be disposed between the holder 310 and the base 110. The lower plate 213 may be disposed below the holder 310 and the mover 330. A lower stopper being in contact with the base 110 may be formed at a lower surface of the lower plate 213. The lower stopper may be formed in any one or more of the housing 210 and the base 110. The lower stopper may mechanically restrict the downward movement of the housing 210.

The housing 210 may comprise a side plate 214. The side plate 214 may be extended from the lower plate 213. The side plate 214 may comprise a plurality of side plates. The side plate 214 may comprise four side plates. A first coil 220 may be disposed in the side plate 214. A third ball 530 may be disposed in the side plate 214.

The lens driving device 10 may comprise a first coil 220. The first mover 200 may comprise a first coil 220. The first coil 220 may face the first magnet 120. The first coil 220 may be disposed to face the first magnet 120. The first coil 220 may move the housing 210 and the holder 310 in an optical axis direction. The first coil 220 may be an AF driving coil. The first coil 220 may move the housing 210 and the holder 310 in an optical axis direction through interaction with the first magnet 120. The first coil 220 may move the housing 210 and the holder 310 in an optical axis direction through electromagnetic interaction with the first magnet 120. The first coil 220 may be disposed in the housing 210. The first coil 220 may be electrically connected to the substrate 400.

The lens driving device 10 may comprise a second coil 230. The first mover 200 may comprise a second coil 230. The second coil 230 may be disposed in the housing 210. The second coil 230 may be disposed at a position corresponding to the second magnet 320. The second coil 230 may move the holder 310 in a direction perpendicular to the optical axis direction. The second coil 230 may be an OIS driving coil. The second coil 230 may move the holder 310 in a direction perpendicular to the optical axis direction through interaction with the second magnet 320. The second coil 230 may move the holder 310 in a direction perpendicular to the optical axis direction through electromagnetic interaction with the second magnet 320. The second coil 230 may be disposed at a lower surface of the lower plate 213 of the housing 210.

The second coil 230 may comprise a plurality of coils. The second coil 230 may comprise four coils. The second coil 230 may comprise second-first to second-fourth coils 231, 232, 233, and 234. The second coil 230 may comprise an OIS-X coil that moves the holder 310 in an x-axis direction (first direction). The second coil 230 may comprise an OIS-Y coil that moves the holder 310 in a y-axis direction (a second direction perpendicular to the first direction). At this time, the optical axis may be a z-axis. The second-first coil 231 and the second-second coil 232 may move the holder 310 in an x-axis direction. The second-first coil 231 and the second-second coil 232 may be electrically connected. As a modified embodiment, the second-first coil 231 and the second-second coil 232 can be electrically separated and controlled respectively. The second-third coil 233 and the second-fourth coil 234 may move the holder 310 in a y-axis direction. The second-third coil 233 and the second-fourth coil 234 may be electrically connected. As a modified embodiment, the second-third coil 233 and the second-fourth coil 234 can be electrically separated and controlled respectively.

The second-first coil 231 may be a first unit coil. The second-second coil 232 may be a second unit coil. The second-third coil 233 may be a third unit coil. The second-fourth coil 234 may be a fourth unit coil.

The lens driving device 10 may comprise a first yoke 240. The first mover 200 may comprise a first yoke 240. The first yoke 240 may be disposed in the housing 210. The first yoke 240 may be disposed inside the first coil 220. The first yoke 240 may be formed of a magnetic material. The first yoke 240 may be formed of metal. At least a portion of the first yoke 240 may face the first magnet 120. The first yoke 240 may be disposed at a position corresponding to the first magnet 120. An attractive force may act between the first yoke 240 and the first magnet 120. Through this, the housing 210 may press the third ball 530 toward the base 110. Therefore, contact between the housing 210 and the third ball 530 and contact between the base 110 and the third ball 530 can be maintained. The first yoke 240 may be an AF yoke.

The lens driving device 10 may comprise a second yoke 250. The first mover 200 may comprise a second yoke 250. The second yoke 250 may be disposed at a lower surface of the lower plate 213 of the housing 210. The second yoke 250 may be disposed inside the second coil 230. In a modified embodiment, the second yoke 250 may be larger than the second coil 230. At this time, the second yoke 250 may be disposed between the second coil 230 and the housing 210. The second yoke 250 may be formed of a magnetic material. The second yoke 250 may be formed of metal. At least a portion of the second yoke 250 may face the second magnet 320. The second yoke 250 may be disposed at a position corresponding to the second magnet 320. An attractive force may act between the second yoke 250 and the second magnet 320. Through this, the mover 330 may press the first ball 510 toward the housing 210. Therefore, contact between the mover 330 and the first ball 510 and contact between the housing 210 and the first ball 510 can be maintained. The second yoke 250 may be an OIS yoke.

The lens driving device 10 may comprise a second mover 300. The second mover 300 may be disposed inside the stator 100. The second mover 300 may be movably disposed inside the first stator 100. The second mover 300 may be disposed inside the first mover 200. The second mover 300 may be movably disposed inside the first mover 200. The second mover 300 may move in a direction perpendicular to the optical axis direction with respect to the stator 100 and the first mover 200. The second mover 300 may move for OIS driving. The second mover 300 may be an OIS mover.

The lens driving device 10 may comprise a holder 310. The second mover 300 may comprise a holder 310. Holder 310 may be disposed inside housing 210. Holder 310 may be disposed inside base 110. The holder 310 may be disposed inside the cover member 130. Holder 310 may be coupled to the lens. A second magnet 320 may be disposed in the holder 310. The holder 310 may move during OIS driving. The holder 310 may move together with the housing 210 even during AF driving.

The holder 310 may comprise a groove 311. A second ball 520 may be disposed in the groove 311. The groove 311 may be a second ball accommodating groove. The groove 311 may be formed in a shape corresponding to at least a portion of the second ball 520. The groove 311 may be formed so that the second ball 520 does not escape. The groove 311 may be in contact with the second ball 520 at one point. Or, the groove 311 may be in contact with the second ball 520 at two points. The groove 311 may be in contact with the second ball 520 at three or more points. The groove 311 may be formed on a lower surface of the holder 310.

The lens driving device 10 may comprise a second magnet 320. The second mover 300 may comprise a second magnet 320. The second magnet 320 may be disposed in the holder 310. The second magnet 320 may face the second coil 230. The second magnet 320 may be disposed to face the second coil 230. The second magnet 320 may be overlapped with the second coil 230 in an optical axis direction. The second magnet 320 may be disposed at a position corresponding to the second coil 230. The second magnet 320 may interact with the second coil 320 electromagnetically. The second magnet 320 may move the holder 310 in a direction perpendicular to the optical axis direction. The second magnet 320 may move the holder 310 in a direction perpendicular to the optical axis direction through interaction with the second coil 230. The second magnet 320 may move the holder 310 in a direction perpendicular to the optical axis direction through electromagnetic interaction with the second coil 230.

The second magnet 320 may comprise a plurality of magnets. The second magnet 320 may comprise four magnets. The second magnets 320 may be formed in a number corresponding to that of second coils 230. The second magnet 320 may comprise a second-first magnet 321 that moves the holder 310 in an x-axis direction (first direction). At this time, the second-first magnet 321 may be an OIS-X magnet. The second magnet 320 may comprise a second-second magnet 322 that moves the holder 310 in a y-axis direction (a second direction perpendicular to the first direction). At this time, the second-second magnet 322 may be an OIS-Y magnet. At this time, the optical axis may be a z axis. Each of the second-first magnet 321 and the second-second magnet 322 may comprise two magnets. The second-first magnet 321 may be disposed in the mover 330. A second-second magnet 322 may be disposed in the holder 310.

Conversely, the second-first magnet 321 may be disposed in the holder 310. The second-second magnet 322 may be disposed in the mover 330.

The lens driving device 10 may comprise a mover 330. The mover 330 may comprise a frame. The second mover 300 may comprise a mover 330. The mover 330 may be disposed between the holder 310 and the housing 210. The mover 330 may move in a direction perpendicular to the optical axis direction with respect to the housing 210. The mover 330 may move in a first direction perpendicular to the optical axis direction with respect to the housing 210. The holder 310 may move in a second direction perpendicular to the optical axis direction and the first direction with respect to the mover 330. Conversely, the holder 310 may move in a first direction perpendicular to the optical axis direction with respect to the mover 330. The mover 330 may move in a second direction perpendicular to the optical axis direction and the first direction with respect to the housing 210. A direction in which the mover 330 moves with respect to the housing 210 and a direction in which the holder 310 moves with respect to the mover 330 may be perpendicular to each other.

The mover 330 may comprise a first groove 331. The first groove 331 may be formed at an upper surface of the mover 330. A second ball 520 may be disposed in the first groove 331. The first groove 331 may be a second ball accommodating groove. The first groove 331 may be formed to be longer than the diameter of the second ball 520 in an optical axis direction and in a second direction perpendicular to the first direction. The first groove 331 may guide the second ball 520 to move in a second direction. As a modified embodiment, the first groove 331 may guide the second ball 520 to move in a first direction. At this time, the first groove 211 of the housing 210 may guide the first ball 510 to move in the second direction. As illustrated in FIG. 14 (*a*), the first groove 211 may have a triangular cross section. Or, as illustrated in FIG. 14 (*b*), the cross section of the first groove 211 may be formed in a rectangular shape. Or, as illustrated in FIG. 14 (*c*), the cross section of the first groove 211 may be formed in a semicircular shape.

The mover 330 may comprise a second groove 332. The second groove 332 may be formed at a lower surface of the mover 330. A first ball 510 may be disposed in the second groove 332. The second groove 332 may be a first ball accommodating groove. The second groove 331 may be formed in a shape corresponding to at least a portion of the first ball 510. The first ball 510 may perform a rolling motion in the second groove 331. The first ball 510 may rotate while maintaining at least a portion inserted into the second groove 331. The second groove 332 may arrest the first ball 510 in a way that it can be rotated but cannot be moved. As illustrated in FIG. 13, the second groove 332 may be formed in a hemispherical shape.

The lens driving device 10 may comprise a substrate 400. The substrate 400 may connect the housing 210 and the base 110. The substrate 400 may be disposed between the base 110 and the housing 210. The substrate 400 may be electrically connected to the first coil 220. The substrate 400 may be electrically connected to the second coil 230. At least a portion of the substrate 400 may be formed of a flexible printed circuit board (FPCB). The substrate 400 may be formed in a shape symmetrical with respect to an optical axis. The substrate 400 may elastically support the movement of the housing 210. The substrate 400 may support the housing 210 to move in an optical axis direction with respect to the base 110. The substrate 400 may be coupled to a lower surface of the lower plate 213 of the housing 210.

The substrate 400 may comprise a first coupling portion 410. The first coupling portion 410 may be coupled to the base 110. The first coupling portion 410 may comprise a hole into which a protrusion of the base 110 is inserted. The first coupling portion 410 may be disposed at an upper surface of the base 110. The first coupling portion 410 may be fixed to the base 110.

The substrate 400 may comprise a second coupling portion 420. The second coupling portion 420 may be coupled to the housing 210. The second coupling portion 420 may be coupled to the second coil 230 through a conductive member. The second coupling portion 420 may be electrically connected to the second coil 230. The second coupling portion 420 may be electrically connected to the first coil 220. The second coupling portion 420 may comprise a hole into which a protrusion of the housing 210 is inserted. The second coupling portion 420 may be disposed at a lower surface of the housing 210. The second coupling portion 420 may be fixed to the housing 210.

Any one of the first coupling portion 410 and the second coupling portion 420 of the substrate 400 may be referred to as a 'first region' and the other one may be referred to as a 'second region'. The first region of the substrate 400 may be connected to the housing 210 and the second region of the substrate 400 may be connected to the base 110. The first region of the substrate 400 may move according to the movement of the housing 210. The first region may comprise a body portion where the second coil 230 is disposed. The substrate 400 may comprise an elastic connection portion connecting the first region and the second region. In a first embodiment, the elastic connection portion may connect the body portion and the second region. In a second embodiment, the first region may comprise one end portion being coupled to the housing 210 and an elastic connection portion connecting the one end portion and the body portion.

The substrate 400 may comprise a connecting portion 430. The connecting portion 430 may be an 'elastic connection portion'. The connecting portion 430 may connect the first coupling portion 410 and the second coupling portion 420. The connecting portion 430 may comprise a flexible portion. The connecting portion 430 may have flexibility. The connecting portion 430 may be formed of FPCB. The connecting portion 430 may comprise a bent shape. The connecting portion 430 may comprise a shape bent a plurality of times. The connecting portion 430 may comprise a first portion having a shape bent a plurality of times. The first portion of the substrate 400 may be overlapped with the second coil 230 in an optical axis direction.

The substrate 400 may comprise a terminal part. The terminal part may comprise a terminal 440. The terminal part may be extended from the first coupling portion 410. The terminal part may be extended downward from the first coupling portion 410. The terminal part may be bent from the first coupling portion 410. The terminal 440 may comprise a plurality of terminals. Terminal 440 may comprise: four terminals being electrically connected to the first Hall sensor 621; four terminals being electrically connected to the second Hall sensor 622; two terminals being electrically connected to the second-first coil 231 and the second-second coil 232; two terminals being electrically connected to the second-third coil 233 and the second-fourth coil 234; and four terminals being electrically connected to the driver IC 610. That is, a total of 16 terminals may be comprised. In a modified embodiment, terminal 440 may comprise: seven terminals being electrically connected to the first Hall sensor 621 and the second Hall sensor 622; two terminals being electrically connected to the second-first coil 231 and the second-second coil 232; two terminals electrically connected to the second-third coil 233 and the second-fourth coil 234; and four terminals being electrically connected to the driver IC 610. That is, a total of 15 terminals may be comprised.

The lens driving device 10 may comprise a ball 500. The ball 500 may guide the movement between the base 110, the housing 210, the holder 310, and the mover 330. The ball 500 may guide the movement of the housing 210, the holder 310, and the mover 330 during AF driving and OIS driving. The ball 500 may be formed in a spherical shape. The ball 500 may guide the movement of the housing 210, the holder 310, and the mover 330 through the rotation.

The lens driving device 10 may comprise a first ball 510. The first ball 510 may be in contact with the housing 210 and the mover 330. The first ball 510 may be disposed in the housing 210 and the mover 330. The first ball 510 may be disposed between the housing 210 and the mover 330. The first ball 510 may connect the housing 210 and the mover 330. The first ball 510 may be in contact with the housing 210 at two or more points. The first ball 510 may guide the mover 330 to move in a first direction perpendicular to the optical axis direction with respect to the housing 210. The first ball 510 may be an OIS-X guide ball. The first ball 510 may comprise a plurality of balls. The first ball 510 may comprise a total of six balls on each side, three on each side.

The lens driving device 10 may comprise a second ball 520. The second ball 520 may be disposed in the mover 330 and the holder 310. The second ball 520 may be in contact with the mover 330 and the holder 310. The second ball 520 may be disposed between the mover 330 and the holder 310. The second ball 520 may connect the mover 330 and the holder 310. The second ball 520 may guide the holder 310 to move in a second direction perpendicular to the optical axis direction and the first direction with respect to the mover 330. The second ball 520 may be an OIS-Y guide ball. As a modified embodiment, the second ball 520 may guide the holder 310 to move in a first direction perpendicular to the optical axis direction with respect to the mover 330. At this time, the first ball 510 may guide the holder 310 to move in a second direction perpendicular to the optical axis direction and the first direction with respect to the mover 330. The second ball 520 may comprise a plurality of balls. The second ball 520 may comprise four balls.

The lens driving device 10 may comprise a third ball 530. The third ball 530 may be in contact with the housing 210 and the base 110. The third ball 530 may be disposed in the housing 210 and the base 110. The third ball 530 may be disposed between the housing 210 and the base 110. The third ball 530 may connect the housing 210 and the base 110. The third ball 530 may guide the housing 210 to move in an optical axis direction with respect to the base 110. The third ball 530 may be an AF guide ball. The third ball 530 may comprise a plurality of balls. The third ball 530 may comprise four balls.

The lens driving device 10 may comprise a driver IC 610. The driver IC 610 may comprise a Hall element detecting the first magnet 120. The driver IC 610 may be disposed in the substrate 400. The driver IC 610 may be electrically connected to the first coil 220. The driver IC 610 may be disposed at a position corresponding to the first magnet 120. The driver IC 610 may control the current being applied to the first coil 220. The Hall element may detect the magnetic force of the first magnet 120. The Hall element may detect the position or movement of the first magnet 120. The driver IC 610 may detect the position of the first magnet 120 and adjust the current applied to the first coil 220. That is, the driver IC 610 can perform AF feedback control.

The lens driving device 10 may comprise a Hall sensor 620. The Hall sensor 620 may be disposed in the substrate 400. The Hall sensor 620 may detect the second magnet 320. The Hall sensor 620 may detect the magnetic force of the second magnet 320. The Hall sensor 620 may be disposed at a position corresponding to the second magnet 320. The Hall sensor 620 may detect the position or movement of the second magnet 320. A value detected by the Hall sensor 620 may be used for OIS feedback control.

The Hall sensor 620 may comprise a first Hall sensor 621. The first Hall sensor 621 may detect the second-first magnet 321. The first Hall sensor 621 may be disposed at a position corresponding to the second-first magnet 321. The first Hall sensor 621 may detect the movement of the mover 330 in an x-axis direction. The first Hall sensor 621 may be an OIS-X sensor.

The Hall sensor 620 may comprise a second Hall sensor 622. The second Hall sensor 622 may detect the second-second magnet 322. The second Hall sensor 622 may be disposed at a position corresponding to the second-second magnet 322. The second Hall sensor 622 may detect the movement of the holder 310 in a y-axis direction. The second Hall sensor 622 may be an OIS-Y sensor. Conversely, the first Hall sensor 621 detects the movement of the mover 330 or holder 310 in a y-axis direction and the second Hall sensor 622 may detect the movement of the mover 330 or the holder 310 in an x-axis direction.

In the present embodiment, when current is applied to the second-first coil 231 and the second-second coil 232, the second-first magnet 321 may move in a first direction (x-axis direction) perpendicular to the optical axis direction by the electromagnetic interaction between the second-first and second-second coils 231 and 232 and the second-first magnet 321 (see OIS-X in FIG. 19). At this time, the mover 330 and the holder 310 may also move along with the second-first magnet 321 in a first direction perpendicular to the optical axis direction.

In the present embodiment, when current is applied to the second-third coil 233 and the second-fourth coil 234, the second-second magnet 322 may move in a second direction (y-axis direction) perpendicular to the first direction and the optical axis direction by electromagnetic interaction between the second-third and second-fourth coils 233 and 234 and the second-second magnet 322 (see OIS-Y in FIG. 19). At this time, the holder 310 may also move along with the second-second magnet 322 in a second direction perpendicular to the optical axis direction and the first direction.

In the present embodiment, when a forward current is applied to the first coil 220, the first coil 220 may move upward along an optical axis (z-axis) by electromagnetic interaction between the first coil 220 and the first magnet 120. At this time, the housing 210, the mover 330, and the holder 310 may also move upward along with the first coil 220 (see AF of FIG. 20).

In addition, when reverse current is applied to the first coil 220, the second coil 220 may move downward along an optical axis by electromagnetic interaction between the first coil 220 and the first magnet 120. At this time, the housing 210, the mover 330, and the holder 310 may also move downward together with the first coil 220 (see AF of FIG. 20).

In a modified embodiment, the first coil 220 and the first magnet 120 may be disposed interchangeably. The first magnet 120 may be disposed in the housing 210 and the first coil 220 may be disposed in the base 110. In addition, the second coil 230 and the second magnet 320 may also be disposed interchangeably. The second coil 230 may be disposed in the holder 310 and the mover 330 and the second magnet 320 may be disposed in the housing 210.

The present embodiment may comprise an AF coil, an OIS coil, and a yoke in an AF unit (a moving part as a driving unit). In addition, an FPCB for applying current to the driver may be comprised. At this time, part of the FPCB may move with the AF unit. The FPCB may be separated in the form of a plurality of legs so as not to interfere with AF driving.

In the present embodiment, the magnet for driving one axis of the OIS is mounted in the mover 330 and the magnet for driving the other axis is mounted in the holder 310 and may be driven separately. For left and right OIS driving, balls may be disposed for each layer. One side of the ball rolling part may form a spherical groove in order to roll in place. A yoke may be inserted inside the OIS coil to maintain the OIS posture.

Since the OIS coil is disposed inside the AF driver through the present embodiment, it may be easy to secure linearity and Hall linearity for OIS driving. At this time, Hall linearity may be the linearity with respect to the Hall element and/or Hall sensor. In the present embodiment, there is an advantage in that OIS cross talk does not occur during AF driving. That is, during AF driving, Hall signal interference in the OIS side can be minimized. Restoration force of AF unit can be expected by FPCB.

Hereinafter, a lens driving device according to a modified embodiment will be described with reference to drawings.

Figure 21:
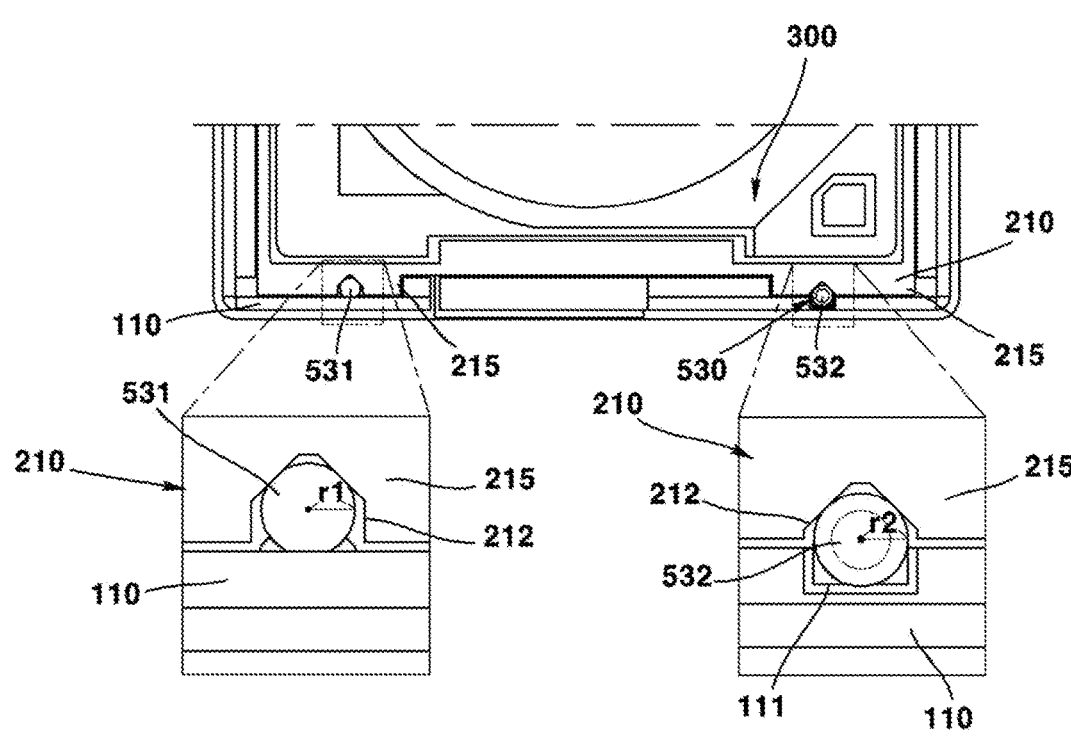
FIG. 21 is a plan view and an enlarged view illustrating a third ball and related configurations of a lens driving device according to a modified embodiment.
Figure 22:
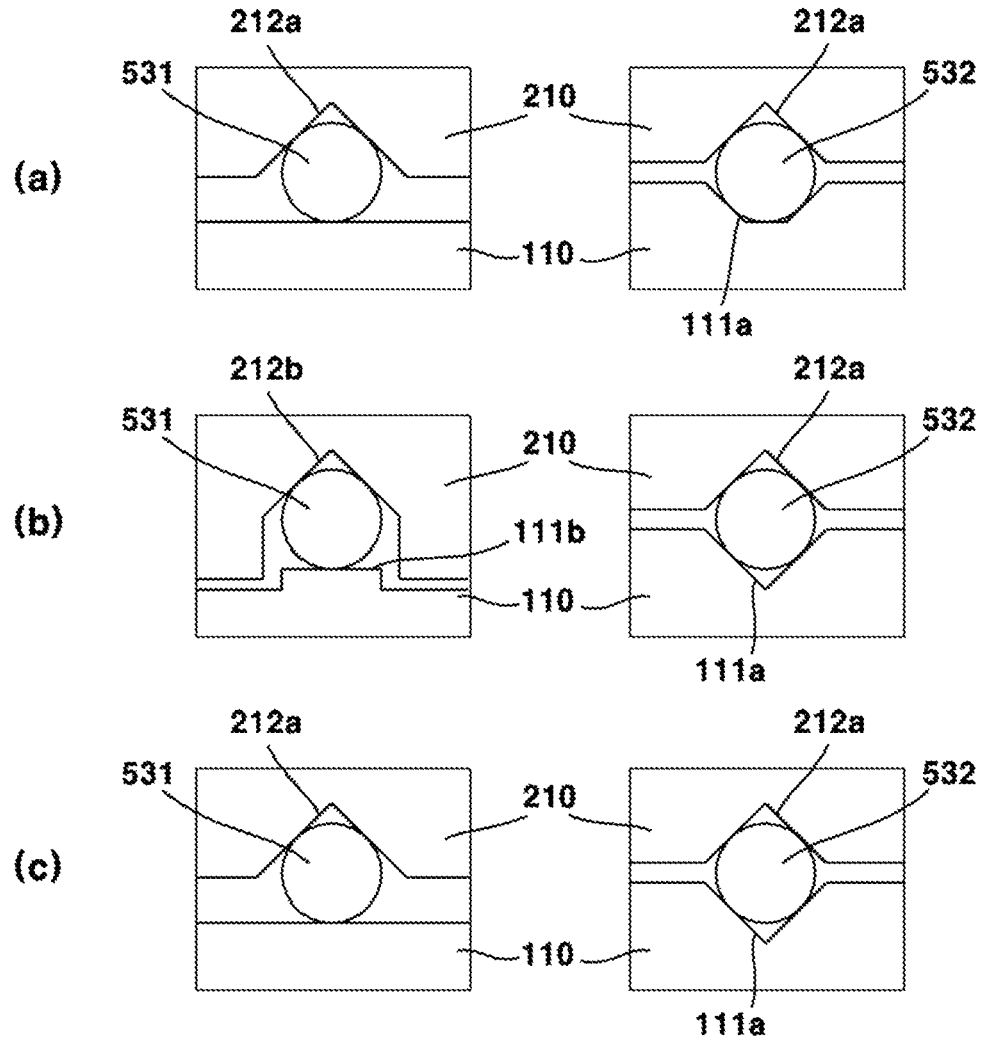
FIG. 22 is a view illustrating another modified embodiment of a third ball and related configurations illustrated in FIG. 21.
Figure 23:
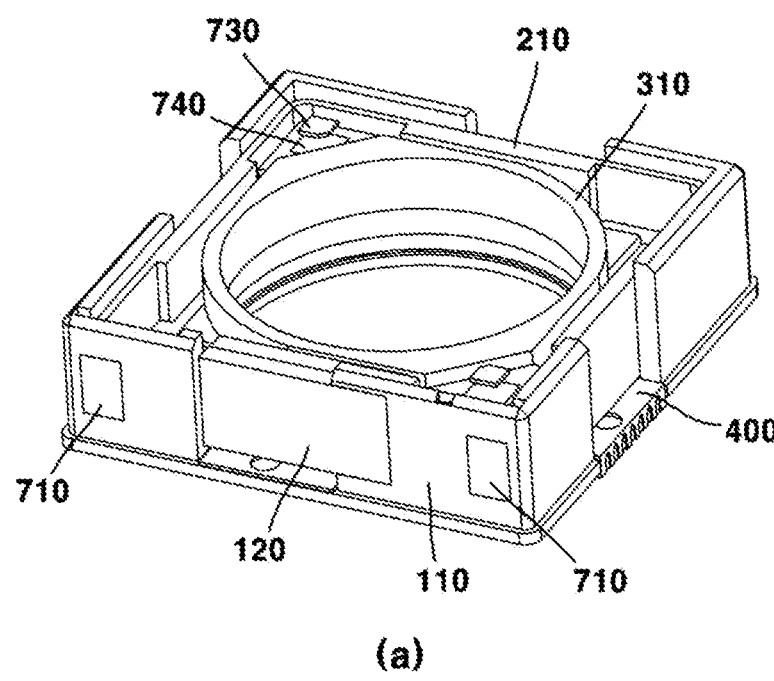
FIGS. 23 and 24 are perspective views illustrating disposition states of a third magnet and a fourth magnet of a lens driving device according to a modified embodiment.
Figure 23:
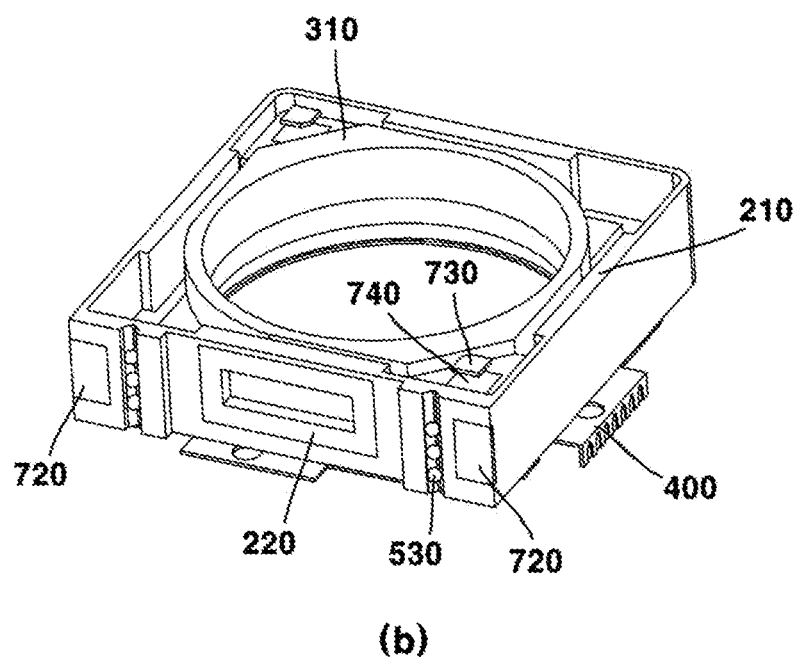
Figure 24:
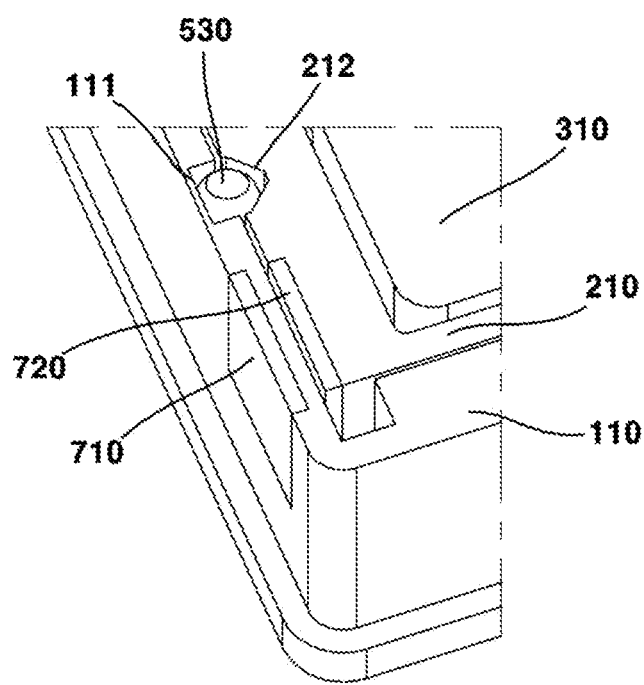
Figure 25:
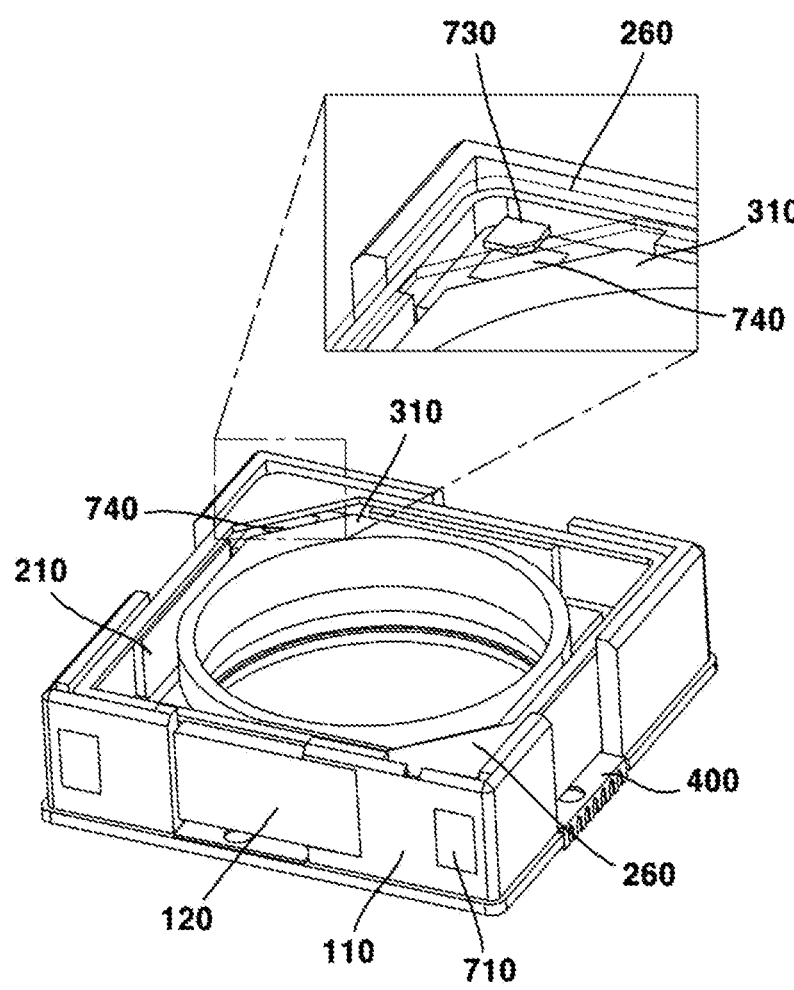
FIG. 25 is a perspective view and a partially enlarged perspective view illustrating disposition states of a housing cover, a fifth magnet, and a sixth magnet of a lens driving device according to a modified embodiment.
Figure 26:
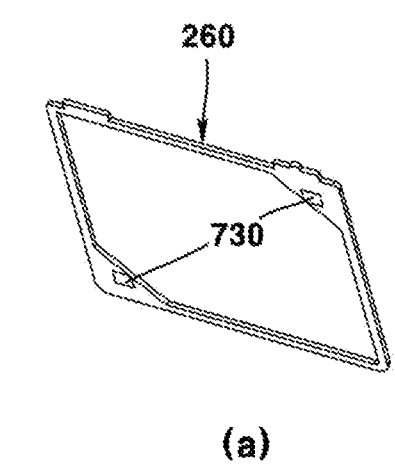
FIG. 26 (*a*) is a view illustrating the housing cover and a fifth magnet, and (b) is a view illustrating the disposition of the sixth magnet.
Figure 26:
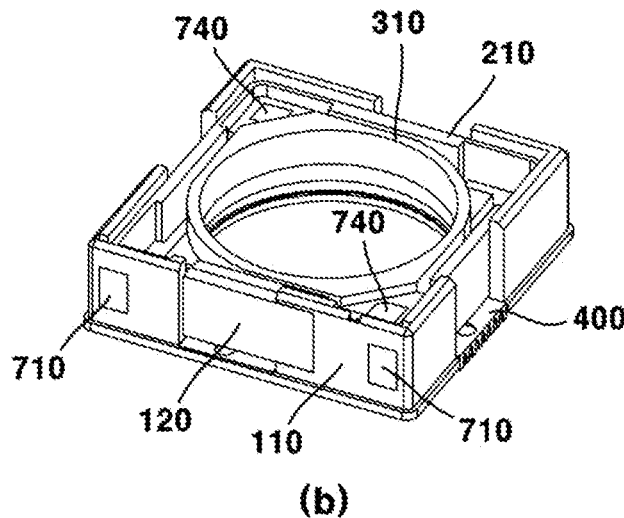
Figure 27:
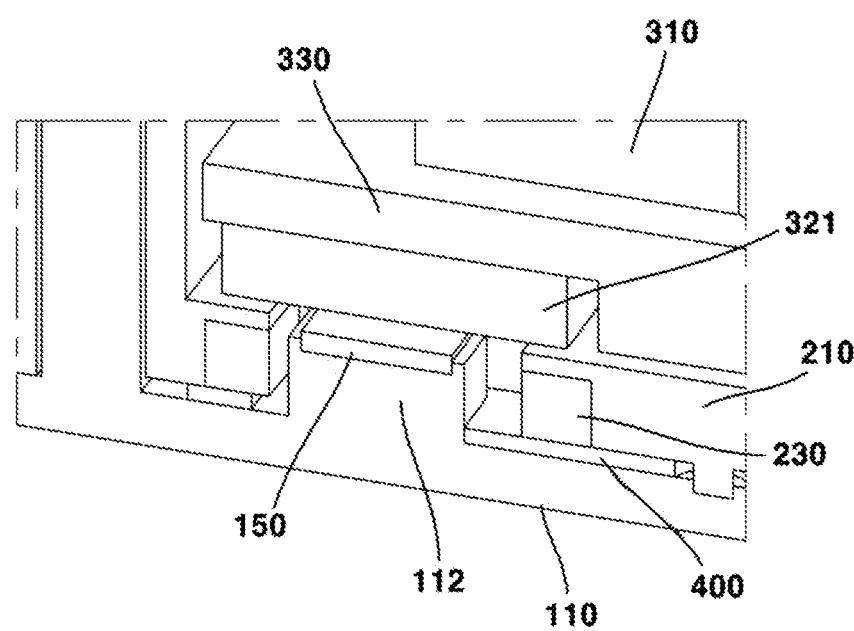
FIG. 27 is a view illustrating the disposition of a second yoke of a lens driving device according to the modified embodiment.

FIG. 21 is a plan view and an enlarged view illustrating a third ball and related configurations of a lens driving device according to a modified embodiment; FIG. 22 is a view illustrating another modified embodiment of a third ball and related configurations illustrated in FIG. 21; FIGS. 23 and 24 are perspective views illustrating disposition states of a third magnet and a fourth magnet of a lens driving device according to a modified embodiment; FIG. 25 is a perspective view and a partially enlarged perspective view illustrating disposition states of a housing cover, a fifth magnet, and a sixth magnet of a lens driving device according to a modified embodiment; FIG. 26 (*a*) is a view illustrating the housing cover and a fifth magnet, and (*b*) is a view illustrating the disposition of the sixth magnet; and FIG. 27 is a view illustrating the disposition of a second yoke of a lens driving device according to the modified embodiment.

The lens driving device according to a modified embodiment will be mainly explained focusing on the differences from the lens driving device according to the present embodiment. A description of a configuration of a lens driving device according to a modified embodiment, which has not been described below, may be inferred from a corresponding description of a lens driving device according to the present embodiment.

In a modified embodiment, as illustrated in FIGS. 21 and 22, two grooves for guiding the third ball 530 are formed in the housing 210 and only one may be formed in the base 110.

The lens driving device may comprise a third ball 530 being in contact with the housing 210 and the base 110. The third ball 530 may comprise a third-first ball 531 being disposed at one side of the first coil 220 and a third-second ball 532 being disposed at the other side of the first coil 220. The base 110 may comprise a first surface facing the housing 210 and a groove 111 being recessedly formed at a first surface of the base 110. The third-first ball 531 may be disposed at a first surface of the base 110. The third-second ball 532 may be disposed in the groove 111 of the base 110. A groove may not be formed in a region of the first surface of the base 110 where the third-first ball 531 is disposed. The housing 210 may comprise a protruding portion 215 protruding toward the first surface of the base 110. The third ball 530 may be disposed at a protruding portion 215 of the housing 210. A second groove 212 is formed in the protruding portion 215 of the housing 210 and the third ball 530 may be disposed in the second groove 212.

The third-first ball 531 may be a first unit ball. The third-second ball 532 may be a second unit ball.

In a modified embodiment, the radius r1 of the third-first ball 531 may be different from the radius r2 of the third-second ball 532. Or, the radius r1 of the third-first ball 531 may be the same as the radius r2 of the third-second ball 532.

As illustrated in FIG. 21, the groove 111 of the base 110 is formed only at a position corresponding to the third-second ball 532, and may not be formed at a position corresponding to the third-first ball 531. As illustrated in FIG. 21, in a modified embodiment, the cross section of the groove 111 of the base 110 may comprise three straight lines forming right angles to each other. That is, the cross section of the groove 111 of the base 110 may be formed in a rectangular shape with one side open. At this time, the third ball 530 may be in contact with the groove 111 of the base 110 at three points.

As illustrated in FIG. 22, the second groove 212 of the housing 212 and the groove 111 of the base 110 may be modified in various ways. As illustrated in FIG. 22 (*a*) and (*c*), the cross section of the groove 212*a* of the housing 212 being disposed with the third-first ball 531 may be formed in a triangular shape with one side open. At this time, the third-first ball 531 may be in two-point contact with the groove 212*a* of the housing 210. As illustrated in FIG. 22 (*b*), the cross section of the groove 212*b* of the housing 212 being disposed with the third-first ball 531 may be formed in a pentagonal shape with one side open. Compared to the groove 212*a* of the previous embodiment, 212*b* may be recessed more deeply. The third-first ball 531 may be in two-point contact with the groove 212*b* of the housing 210. As illustrated in FIG. 22 (*a*), (*b*) and (*c*), the cross section of the groove 212*a* of the housing 212 being disposed with the third-second ball 532 may be formed in a triangular shape with one side open. At this time, the third-second ball 532 may be in two-point contact with the groove 212*a* of the housing 210.

As illustrated in FIG. 22 (*a*) and (*c*), a portion of the base 110 being disposed with the third-first ball 531 may be formed as a flat surface. Or, as illustrated in FIG. 22 (*b*), a portion of the base 110 being disposed with the third-first ball 531 may be formed as a protrusion 111*b*. As illustrated in FIG. 22 (*a*), the cross section of the groove 111*a* of the base 110 being disposed with the third-second ball 532 may have a trapezoidal shape with one side open. At this time, the third-second ball 532 may be in three-point contact with the groove 111*a* of the base 110. As illustrated in FIG. 22 (*b*) and (*c*), the cross section of the groove 111*a* of the base 110 being disposed with the third-second ball 532 may be formed in a triangular shape with one side open. At this time, the third-second ball 532 may be in two-point contact with the groove 111*a* of the base 110.

In a modified embodiment, as illustrated in FIGS. 23 and 24, the first yoke 240 is omitted and a magnet generating an attractive force between the base 110 and the housing 210 may be added.

The lens driving device may comprise a third magnet 710 being disposed in the base 110. The third magnet 710 may be disposed at an outer side surface of the base 110. The lens driving device may comprise a fourth magnet 720 being disposed in the housing 210. The fourth magnet 720 may be disposed at an outer side surface of the housing 210. The fourth magnet 720 may be disposed at a position corresponding to the third magnet 710 so that an attractive force acts with the third magnet 710. Through this, the housing 210 may press the third ball 530 toward the base 110. Thus, contact between the third ball 530, the housing 210, and the base 110 may be maintained.

In a modified embodiment, as illustrated in FIGS. 25 and 26, the second yoke 250 is omitted and a magnet for pressing the holder 310 and the mover 330 toward the housing 210 may be added.

The lens driving device may comprise a housing cover 260 being coupled to the housing 210 and disposed above the holder 310. The housing cover 260 may be a 'frame cover'. The lens driving device may comprise a fifth magnet 730 being disposed in the housing cover 260. The fifth magnet 730 may be disposed at a lower surface of the housing cover 260. The lens driving device may comprise a sixth magnet 740 being disposed in the holder 310. The mover 330 and the second ball 520 may be disposed below the holder 310. The sixth magnet 740 may be disposed at a position corresponding to the fifth magnet 730 so that a repulsive force acts with the fifth magnet 730. Through this, the holder 310 may press the second ball 520 toward the mover 330. Therefore, contact between the second ball 520, the holder 310, and the mover 330 may be maintained. Furthermore, the holder 310 may press the first ball 510 toward the housing 210 through the mover 330. Thus, contact between the first ball 510, the mover 330, and the housing 210 may be maintained.

In a modified embodiment, as illustrated in FIG. 27, the second yoke 250 being disposed in the housing 210 is omitted and the second yoke 150 may be disposed in the base 110.

The lens driving device may comprise a second yoke 150 being disposed at a position corresponding to the second magnet 320 in the base 110 so that an attractive force acts with the second magnet 320. Through this, the mover 330 may press the first ball 510 toward the housing 110. Thus, contact between the first ball 510, the mover 330, and the housing 210 may be maintained. The base 110 may comprise a protruding portion 112 protruding toward the second magnet 320. The second yoke 150 may be disposed at an upper surface of the protruding portion 112. At least a portion of the protruding portion 112 may be disposed inside the second coil 230.

As another modified embodiment, the second yoke that induces attractive force with the second magnet 320 may be disposed in the substrate 400 instead of the base 110 and the housing 210. The second yoke may be disposed at a position corresponding to the second magnet 320 of the substrate 400.

In the present embodiment, the mover may comprise the first to third frames. The first frame may comprise the housing 210, the second frame may comprise the holder 310, and the third frame may comprise the frame. At this time, the frame may comprise a mover 330. The housing 210 may be a first frame. The holder 310 may be a second frame. The mover 330 may be a third frame. One among the housing 210, the holder 310, and the mover 330 is referred to as a 'first frame', the other one is referred to as a 'second frame', and the remaining one may be referred to as a 'third frame'.

Any one of the fifth magnet 730 and the sixth magnet 740 is referred to as a 'first repulsive force magnet' and the other one may be referred to as a 'second repulsive force magnet'. The first repulsive force magnet may be disposed in the second frame.

The lens driving device 10 may comprise a second repulsive force magnet being disposed in the first frame cover and disposed at a position corresponding to the first repulsive force magnet. A repulsive force may act in an optical axis direction between the first repulsive force magnet and the second repulsive force magnet. The lens driving device 10 may comprise a third frame being disposed between the first frame and the second frame. The lens driving device 10 may comprise a fifth magnet being disposed in the third frame. The ordinal numbers written in the third magnet 710, the fourth magnet 720, the fifth magnet 730, and the sixth magnet 740 are for distinction between magnets and may be arbitrarily written. That is, when the third magnet 710 and the fourth magnet 720 are omitted from the claims, any one of the fifth magnet 730 and the sixth magnet 740 may be referred to as a third magnet and the other one may be referred to as a fourth magnet.

Hereinafter, a camera module according to the present embodiment will be described with reference to drawings.

Figure 28:
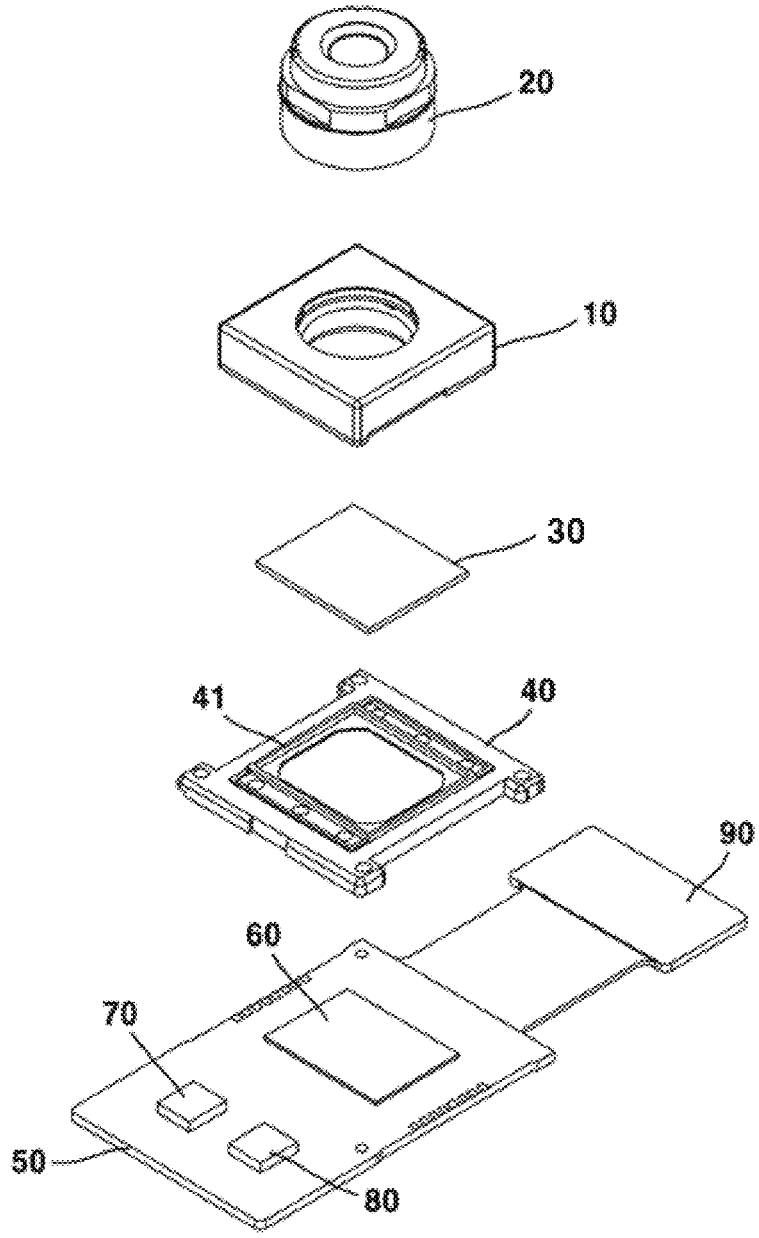
FIG. 28 is an exploded perspective view of a camera module according to the present embodiment.

FIG. 28 is an exploded perspective view of a camera module according to the present embodiment.

A camera module may be a camera device.

The camera module may comprise a lens module 20. The lens module 20 may comprise at least one lens. The lens may be disposed at a position corresponding to the image sensor 60. The lens module 20 may comprise a lens and a barrel. The lens module 20 may be coupled to the bobbin 210 of the lens driving device 10. The lens module 20 may be coupled to the bobbin 210 by screw-coupling and/or an adhesive. The lens module 20 may move integrally with the bobbin 210.

The camera module may comprise a filter 30. The filter 30 may serve to block light of a specific frequency band from entering the image sensor 60 from light passing through the lens module 20. The filter 30 may be disposed parallel to an x-y plane. The filter 30 may be disposed between the lens module 20 and the image sensor 60. The filter 30 may be disposed in the sensor base 40. The filter 30 may comprise an infrared filter. The infrared filter may block light of an infrared region from being incident on the image sensor 60. The infrared filter may comprise an infrared reflection filter or an infrared absorption filter.

The camera module may comprise a sensor base 40. The sensor base 40 may be disposed between the lens driving device 10 and the printed circuit board 50. The sensor base 40 may comprise a protruding portion 41 in which the filter 30 is disposed. An opening may be formed in a portion of the sensor base 40 being disposed with the filter 30 so that light passing through the filter 30 may be incident to the image sensor 60. An adhesive member may be disposed between the sensor base 40 and the lens driving device 10. The adhesive member may attach the lens driving device 10 to an upper surface of the sensor base 40. The adhesive member may be configured to prevent foreign substances from entering the lens driving device 10. The adhesive member may comprise any one or more among an epoxy, a thermosetting adhesive, and an ultraviolet curable adhesive.

The camera module may comprise a printed circuit board 50. The printed circuit board 50 may be a substrate or a circuit board. A lens driving device 10 may be disposed on the printed circuit board 50. A sensor base 40 may be disposed between the printed circuit board 50 and the lens driving device 10. The printed circuit board 50 may be electrically connected to the lens driving device 10. An image sensor 60 may be disposed in the printed circuit board 50. The printed circuit board 50 may be provided with various circuits, elements, control units, and the like in order to convert an image being formed by the image sensor 60 into an electrical signal and transmit it to an external device.

The camera module may comprise an image sensor 60. The image sensor 60 may have a configuration in which light passing through the lens and the filter 30 is incident to form an image. The image sensor 60 may be mounted on the printed circuit board 50. The image sensor 60 may be electrically connected to the printed circuit board 50. As an example, the image sensor 60 may be coupled to the printed circuit board 50 by a surface mounting technology (SMT). As another example, the image sensor 60 may be coupled to the printed circuit board 50 by a flip chip technology. The image sensor 60 may be disposed such that an optical axis coincides with a lens. That is, the optical axis of the image sensor 60 and the optical axis of the lens may be aligned. The image sensor 60 may convert light irradiated onto an effective image area of the image sensor 60 into an electrical signal. The image sensor 60 may be any one among a charge coupled device (CCD), a metal oxide semi-conductor (MOS), a CPD, and a CID.

The camera module may comprise a motion sensor 70. The motion sensor 70 may be mounted on the printed circuit board 50. The motion sensor 70 may be electrically connected to the control unit 80 through a circuit pattern provided in the printed circuit board 50. The motion sensor 70 may output rotational angular velocity information by the movement of the camera module. The motion sensor 70 may comprise a 2-axis or 3-axis gyro sensor or an angular velocity sensor.

The camera module may comprise a control unit 80. The control unit 80 may be disposed in the printed circuit board 50. The control unit 80 may be electrically connected to the coil 130 of the lens driving device 10. The control unit 80 may individually control the direction, intensity, and amplitude of current being supplied to the coil 130. The control unit 80 may perform an auto focus function by controlling the lens driving device 10. The control unit 80 may be electrically connected to the Hall sensor 140. The control unit 80 may detect the position of the mover 200 through the Hall sensor 140 and perform autofocus feedback control for the lens driving device 10.

The camera module may comprise a connector 90. The connector 90 may be electrically connected to the printed circuit board 50. The connector 90 may comprise a port for electrical connection with an external device.

Hereinafter, an optical device according to the present embodiment of the present invention will be described with reference to the drawings.

Figure 29:
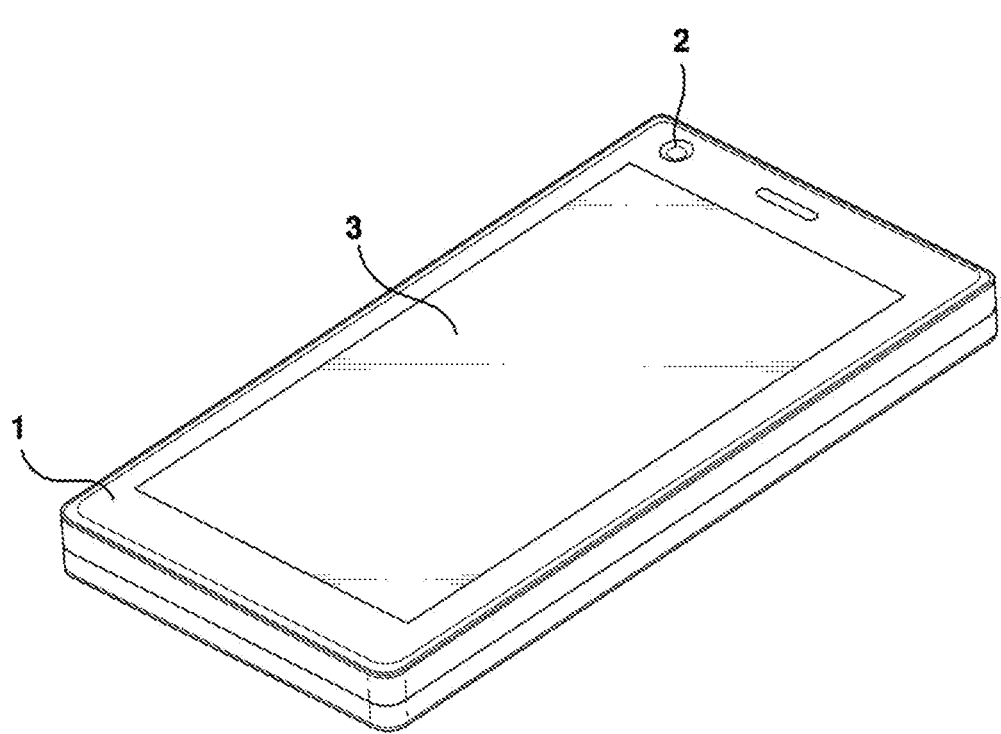
FIG. 29 is a perspective view of an optical device according to a present embodiment.

FIG. 29 is a perspective view of an optical device according to a present embodiment.

Optical devices comprise cell phones, portable phones, smart phones, portable communication devices, portable smart devices, portable terminals, digital cameras, computers, laptop computers, digital broadcasting terminals, personal digital assistants (PDAs), portable multimedia players (PMPs) and navigation. However, the type of optical device is not limited thereto, and any device for photographing a video or photo may be comprised in the optical device.

The optical device may comprise a main body 1. The main body 1 may form the appearance of an optical device. The main body 1 can accommodate the camera module 2. A display 3 may be disposed at a first surface of the main body 1. For example, the display 3 and the camera module 2 are disposed at a first surface of the main body 1, and a camera module 2 may be additionally disposed at a second surface at an opposite side of the first surface of the main body 1.

The optical device may comprise a camera module 2. The camera module 2 may be disposed in the main body 1. At least a portion of the camera module 2 may be accommodated inside the main body 1. The camera module 2 may be provided in plurality. The camera module 2 may comprise dual, triple or more camera modules. The camera module 2 may be disposed at each of the first surface of the main body 1 and the second surface at an opposite side of the first surface of the main body 1. The camera module 2 may capture an image and/or video of a subject.

The optical device may comprise a display 3. The display 3 may be disposed in the main body 1. The display 3 may be disposed at a first surface of the main body 1. The display 3 may output images and/or videos photographed by the camera module 2.

Although the embodiment of the present invention has been described above with reference to the accompanying drawings, those of ordinary skill in the art to which the present invention belongs will understand that the present invention may be embodied in other specific forms without changing the technical spirit or essential features thereof. Therefore, it should be understood that the embodiments described above are illustrative in all respects and not restrictive.

The invention claimed is:

1. A lens driving device comprising:
a base;
a first frame disposed on the base;
a second frame disposed on the first frame;
a third frame disposed between the first frame and the second frame;
a second magnet disposed on the second frame;
a second coil disposed at a position corresponding to the second magnet;
a third ball in contact with the first frame and the base;
a cover member including an upper plate and a side plate extending from the upper plate; and
a spacer disposed between the cover member and the base,
wherein the first frame is configured to be moved in an optical axis direction,
wherein the second magnet and the second coil are configured to move the second frame in a direction perpendicular to the optical axis direction,
wherein the base comprises a first lateral wall, and a groove formed on an inner surface of the first lateral wall and disposed with the third ball,
wherein the spacer is formed separately from the base,
wherein the spacer includes an upper plate comprising a lower surface disposed on an upper surface of the first lateral wall of the base and a protruding portion protruding in a longitudinal axis of the protruding portion from the lower surface of the upper plate,
wherein the protruding portion is overlapped with the third ball in the optical axis direction, and
wherein the protruding portion protrudes toward the third ball.

2. The lens driving device of claim 1, comprising a substrate disposed between the base and the first frame,
wherein the second coil is disposed between the first frame and the substrate.

3. The lens driving device of claim 2, wherein the substrate comprises a first region coupled to the base, a second region coupled to the first frame, and an elastic connection portion connecting the first region and the second region, and
wherein the elastic connection portion of the substrate comprises a portion having flexibility.

4. The lens driving device of claim 3, wherein the elastic connection portion of the substrate comprises a shape bent a plurality of times, and
wherein the elastic connection portion of the substrate is overlapped with the second coil in the optical axis direction.

5. The lens driving device of claim 2, wherein the substrate is formed in a shape symmetrical with respect to an optical axis.

6. The lens driving device of claim 1, comprising:
a first ball disposed between the first frame and the third frame; and
a second ball disposed between the third frame and the second frame.

7. The lens driving device of claim 6, wherein the first frame comprises a first groove disposed with the first ball,
wherein the first ball is in contact with the first frame at two or more points, and
wherein the first groove of the first frame is formed to be greater than a diameter of the first ball in a first direction perpendicular to the optical axis direction.

8. The lens driving device of claim 7, wherein the third frame comprises a first groove formed on an upper surface of the third frame and disposed with the second ball, and
wherein the first groove of the third frame is formed to be greater than a diameter of the second ball in a second direction perpendicular to the optical axis direction and the first direction.

9. The lens driving device of claim 8, wherein the third frame comprises a second groove formed on a lower surface of the third frame and disposed with the first ball,
wherein the second groove of the third frame is formed in a shape corresponding with at least a portion of the first ball,
wherein the second frame comprises a groove disposed with the second ball, and
wherein the groove of the second frame is formed in a shape corresponding with at least a portion of the second ball.

10. The lens driving device of claim 6, wherein the first ball is configured to guide the third frame to move in a first direction perpendicular to the optical axis direction with respect to the first frame, and
wherein the second ball is configured to guide the second frame to move in a second direction perpendicular to the optical axis direction and the first direction with respect to the third frame.

11. The lens driving device of claim 1, comprising:
a first coil disposed on the first frame; and
a first magnet disposed on the base.

12. The lens driving device of claim 11, comprising a first yoke disposed on the first frame and disposed in the first coil.

13. The lens driving device of claim 6, comprising a substrate disposed between the base and the first frame,
wherein the first frame comprises a lower plate and a side plate extending from the lower plate,
wherein second coil disposed on a lower surface of the lower plate of the first frame, and
wherein the substrate is coupled with the lower surface of the lower plate of the first frame.

14. The lens driving device of claim 13, comprising a second yoke disposed on the lower surface of the lower plate of the first frame and disposed in the second coil.

15. The lens driving device of claim 1,
wherein the third ball is configured to guide the first frame to be moved in the optical axis direction with respect to the base.

16. The lens driving device of claim 11, comprising:
a substrate disposed between the base and the first frame;
a driver IC comprising a Hall element configured to sense the first magnet, disposed on the substrate and electrically connected with the first coil; and
a Hall sensor disposed on the substrate and configured to sense the second magnet.

17. A camera module comprising:
a printed circuit board;
an image sensor disposed on the printed circuit board;
the lens driving device of claim 1 disposed on the printed circuit board; and
a lens coupled with the lens driving device.

18. An optical device comprising:
a main body;
the camera module of claim 17 disposed on the main body; and
a display disposed on the main body and configured to output at least any one of an image and a video photographed by the camera module.

19. A lens driving device comprising:
a base;
a housing disposed on the base;
a holder disposed on the housing;
a first magnet and a first coil configured to move the housing and the holder in an optical axis direction;

a second magnet disposed on the holder;
a second coil disposed at a position corresponding to the second magnet;
a third ball in contact with the housing and the base;
a cover member including an upper plate and a side plate extending from the upper plate; and
a spacer disposed between the cover member and the base,
wherein the second coil is configured to move the holder in a direction perpendicular to the optical axis direction,
wherein the base comprises a first lateral wall, and a groove formed on an inner surface of the first lateral wall and disposed with the third ball,
wherein the spacer is formed separately from the base,
wherein the spacer includes an upper plate comprising a lower surface disposed on an upper surface of the first lateral wall of the base and a protruding portion protruding in a longitudinal axis of the protruding portion from the lower surface of the upper plate,
wherein the protruding portion is overlapped with the third ball in the optical axis direction, and
wherein the protruding portion protrudes toward the third ball.

20. The lens driving device of claim 1, wherein at least a portion of the protruding portion of the spacer is inserted into the groove of the base, and
wherein the at least a portion of the protruding portion of the spacer is overlapped with the groove of the base in the direction perpendicular to the optical axis direction.

* * * * *